United States Patent
Copper

(10) Patent No.: US 10,713,597 B2
(45) Date of Patent: Jul. 14, 2020

(54) SYSTEMS AND METHODS FOR PREPARING DATA FOR USE BY MACHINE LEARNING ALGORITHMS

(71) Applicant: Jack Copper, Grand Cayman (KY)

(72) Inventor: Jack Copper, Grand Cayman (KY)

(73) Assignee: NeuralStudio SECZ, Grand Cayman (KY)

( * ) Notice: Subject to any disclaimer, the term of this patent is extended or adjusted under 35 U.S.C. 154(b) by 0 days.

(21) Appl. No.: 16/325,198

(22) PCT Filed: Jan. 21, 2019

(86) PCT No.: PCT/US2019/014392
§ 371 (c)(1),
(2) Date: Feb. 13, 2019

(87) PCT Pub. No.: WO2019/144066
PCT Pub. Date: Jul. 25, 2019

(65) Prior Publication Data
US 2019/0340533 A1   Nov. 7, 2019

Related U.S. Application Data

(60) Provisional application No. 62/620,059, filed on Jan. 22, 2018.

(51) Int. Cl.
G06N 20/00       (2019.01)
G06F 16/22       (2019.01)

(52) U.S. Cl.
CPC .......... *G06N 20/00* (2019.01); *G06F 16/22* (2019.01)

(58) Field of Classification Search
None
See application file for complete search history.

(56) References Cited

U.S. PATENT DOCUMENTS 6,260,036 B1 *   7/2001   Almasi ............... G06K 9/6251
                                                                  707/688
7,089,592 B2     8/2006   Adjaoute
                          (Continued)

FOREIGN PATENT DOCUMENTS

WO    2007147166       12/2007
WO    WO-2007147166 A2 *  12/2007  ............... G06N 5/02

OTHER PUBLICATIONS

Andridge, Rebecca R., and Roderick JA Little. "A review of hot deck imputation for survey non-response." International statistical review 78, No. 1 (2010): 40-64. (Year: 2010).*

(Continued)

*Primary Examiner* — Alexey Shmatov
*Assistant Examiner* — Casey R. Garner
(74) *Attorney, Agent, or Firm* — David M. Quinlan, P.C.

(57) ABSTRACT

Historical data used to train machine learning algorithms can have thousands of records with hundreds of fields, and inevitably includes faulty data that affects the accuracy and utility of a primary model machine learning algorithm. To improve dataset integrity it is segregated into a clean dataset having no invalid data values and a faulty dataset having the invalid data values. The clean dataset is used to produce a secondary model machine learning algorithm trained to generate from plural complete data records a replacement value for a single invalid data value in a data record, and a tertiary model machine learning clustering algorithm trained to generate from plural complete data records replacement values for multiple invalid data values. Substituting the replacement data values for invalid data values in the faulty dataset creates augmented training data which is combined with clean data to train a more accurate and useful primary model.

27 Claims, 9 Drawing Sheets

(56) References Cited

U.S. PATENT DOCUMENTS

| | | | | |
|---|---|---|---|---|
| 8,364,627 | B2* | 1/2013 | Canny | G06Q 30/02 |
| | | | | 706/47 |
| 8,514,392 | B1 | 8/2013 | Carrieri et al. | |
| 9,691,027 | B1 | 6/2017 | Sawant et al. | |
| 9,697,248 | B1 | 7/2017 | Ahire | |
| 9,760,899 | B2 | 9/2017 | Berkman et al. | |
| 2004/0122785 | A1* | 6/2004 | Brown | G06F 8/427 |
| | | | | 706/16 |
| 2006/0179016 | A1 | 8/2006 | Forman et al. | |
| 2015/0170055 | A1* | 6/2015 | Beymer | G06N 20/00 |
| | | | | 706/12 |
| 2016/0048766 | A1* | 2/2016 | McMahon | G06N 5/047 |
| | | | | 706/12 |
| 2016/0078367 | A1* | 3/2016 | Adjaoute | G06N 5/04 |
| | | | | 706/12 |
| 2018/0053114 | A1 | 2/2018 | Adjaoute | |
| 2018/0330280 | A1* | 11/2018 | Erenrich | G06N 5/04 |
| 2018/0336484 | A1* | 11/2018 | Hunt | G06F 17/16 |
| 2019/0019061 | A1* | 1/2019 | Trenholm | G06K 9/6218 |
| 2019/0156298 | A1* | 5/2019 | Ethington | G06Q 10/20 |

OTHER PUBLICATIONS

Barr, Joseph, and Peter Shaw. "AI Application to Data Analysis, Automatic File Processing." In 2018 First International Conference on Artificial Intelligence for Industries (AI4I), pp. 100-105. IEEE, 2018. (Year: 2018).*

Ding, Yaohui, and Arun Ross. "A comparison of imputation methods for handling missing scores in biometric fusion." Pattern Recognition 45, No. 3 (2012): 919-933. (Year: 2012).*

Mayfield, Chris, Jennifer Neville, and Sunil Prabhakar. "ERACER: a database approach for statistical inference and data cleaning." In Proceedings of the 2010 ACM SIGMOD International Conference on Management of data, pp. 75-86. ACM, 2010. (Year: 2010).*

Siddique, Juned, and Thomas R. Belin. "Using an approximate Bayesian bootstrap to multiply impute nonignorable missing data." Computational statistics & data analysis 53, No. 2 (2008): 405-415. (Year: 2008).*

Sullivan, Danielle, and Rebecca Andridge. "A hot deck imputation procedure for multiply imputing nonignorable missing data: The proxy pattern-mixture hot deck." Computational Statistics & Data Analysis 82 (2015): 173-185. (Year: 2015).*

Wasito, Ito. "Least Squares Algorithms with Nearest Neighbour Techniques for Imputing Missing Data Values." PhD diss., University of London, 2003. (Year: 2003).*

Brownlee, J., Clever Algorithms, 1st Edition, Jason Brownlee 2011 (section 8.6 at pp. 336-342), available at https://edoc.site/jason-brownlee-clever-algorithms-pdf-free.html.

Loely-Bori, M., "Dealing With Missing Data: Key Assumptions and Methods for Applied Analysis ," Tech. Rept. No. 4, Boston Univ. School of Public Health, May 6, 2013.

Tian, J., et al., "Anomaly Detection Using Self Organizing Maps Based K Nearest Neighbor Algorithm," European Conference of the Prognostics and Health Management Society (2014).

"Missing Data Techniques with SAS," UCLA Institute for Digital Research and Education (IDRE), available at https://stats.idre.ucla.edu/wp-content/uploads/2017/01/Missing-Data-Techniques_UCLA.pdf.

Wikipedia entry "Feedforward neural network," https://en.wikipedia.org/wiki/Feedforward_neural_network, last visited Feb. 12, 2019.

Humphries, M., "Missing Data & How to Deal: An overview of missing data," Population Research Center, available at https://liberalarts.utexas.edu/prc/_files/cs/Missing-Data.pdf (last visited Feb. 13, 2019).

Wikipedia entry, "Missing data," https://en.wikipedia.org/wiki/Missing_data#Model-based_techniques (last visited Feb. 13, 2019).

Invitation to Pay Additional Fees in PCT/US19/14392, dated Mar. 19, 2019.

International Search Report with Written Opinion of the International Searching Authority in PCT/US19/14392, dated May 15, 2019.

* cited by examiner

SYSTEMS AND METHODS FOR PREPARING DATA FOR USE BY MACHINE LEARNING ALGORITHMS

CROSS-REFERENCE TO RELATED APPLICATION

This application claims the benefit of U.S. provisional application No. 62/620,059, filed Jan. 22, 2018, the entire contents of which are incorporated herein by reference.

BACKGROUND OF THE INVENTION

Field of the Invention

The present invention relates to machine learning, and more particularly, to systems and methods for improving the integrity and quality of data used in training and applying machine learning algorithms to increase the utility and accuracy of computer implementations and executions of such algorithms.

Description of Related Art

A mathematical model is a mathematical expression that describes a phenomenon with sufficient accuracy and consistency as to be useful in the real world. There are two basic forms of mathematical models. One is a "first-principles" model, which attempts to describe a phenomenon of interest on the basis of fundamental laws of physics, chemistry, biology, etc. The second is an "empirical" model, which attempts to describe a phenomenon of interest strictly by collecting and analyzing data related to the phenomenon. This type of data analysis is sometimes referred to as "machine learning," and involves iteratively applying a learning algorithm to a collection of data that putatively describes a phenomenon of interest. The algorithm discovers and learns the relationships in the data that reflect or govern the behavior of the phenomenon.

FIG. 1 is an overview of a computing system 100 for implementing a machine learning process. The right-hand side of FIG. 1 depicts the computing system 100 as having a keyboard 102 and mouse 104 for permitting a model developer to input information to the computing system and a monitor 106 for displaying outputs. The computing system can also include other conventional input/output devices, such as a network interface, printer, scanner, touch pad, USB ports, etc. The computing system 100 includes a computing module 108 that comprises a non-transitory storage module 110 resident on a disc drive or solid state memory device, a central processing unit (CPU) 112 that loads programs and data into the storage module 110 and executes the programs to process the data, and a transitory random access memory (RAM) 114 used by the CPU when executing programs. The computing module 108 is controlled by user inputs from the keyboard 102 and mouse 104 (or other I/O devices) to the CPU 112, which is under the control of operating system software that also causes the CPU to display information on the monitor 106. The computing system 100 communicates with the cloud C via a two-way connection as represented in the drawing.

The left-hand side of FIG. 1 depicts a typical machine-learning process with which data preparation techniques described herein can be used. The process begins at a step S102, where the objectives of the modeling process are specified. At a minimum, a person with sufficient knowledge of the particular domain (subject matter) involved in the analysis identifies the nature of the problem—for example, prediction, classification, or clustering, and appropriate performance metrics that will be used to judge the quality and utility of the model. If the model is a prediction or classification model, one or more values (often referred to as "target values") that represent one or more phenomena of interest will also be identified by the developer.

In a step S104 a machine learning algorithm for generating the empirical model is chosen. In general, prediction problems employ supervised learning, and the target values are more or less continuous numeric values. A prediction machine learning algorithm fits available historical data to a continuous curve (line) as the model output. Classification problems also employ supervised learning, with the target values of a classification problem comprising discrete classes (identified by labels) as the model output. In general, a classification machine learning algorithm maximizes the probability that data in a record indicate that the record belongs to a particular category. Clustering problems generally employ unsupervised learning algorithms that identify similarities in the data as the model output. As noted, the nature of the problem—prediction, classification, or clustering—drives the selection of an appropriate algorithm by the model developer, the computer implementation of which may be commercially available or produced by a developer for a specific purpose. In a general sense, the machine learning algorithm seeks a relationship between a collection of data in a record with an output of interest associated with such data, whether it is a target value in numeric form, a target value in a discrete categorical form, or an output which indicates that data values in a particular data record are similar to data values in a collection of other data records.

In a step S106 the source or sources of the data from which the mathematical model is to be constructed are identified and, if necessary, aggregated into a single file (dataset) in the non-transitory storage 110. This aggregation can be performed using the computing system 100, or it may be performed separately, with the resulting dataset then copied to the non-transitory storage 110. If the aggregation is performed using the computing system 100, the original data can be in a variety of formats, such as in a spreadsheet, a text file, or a database available from Oracle Corp. or Microsoft Corp., to mention some common examples. The CPU 112 loads the original data into the non-transitory storage 110 by any suitable mode, such as extraction from a database, copying it from a USB storage device, or downloading it from the cloud C. In a typical machine learning domain the original data will include thousands, sometimes millions, of data points. An example of such data would be the wide variety of historical information on thousands of individuals to be used to create an empirical mathematical model for predicting the credit score of an individual whose information was not part of the original dataset. Various commercially available programs enable the computing system 100 to accept data in commonly used formats for large numbers of discrete data points. These include, but are not limited to, data combined in a Microsoft Excel® spreadsheet and saved as a simple tab-delimited file, or data directly extracted from a database or databases and stored in tab- or comma-delimited files.

The remaining steps in the process depicted in FIG. 1 are implemented by the computing system in accordance with the chosen machine learning algorithm to develop the specified model using the identified data. The preliminary steps S102, S104, and S106 are conceptually separate from the machine learning process itself, which is implemented by the computing system as indicated by the arrow A in FIG. 1. That is, the depicted preliminary steps are meant to represent conceptual steps in the process. For example, the computing system could include suitable programs for organizing data or interfacing with files or databases containing data, but that is not a salient aspect of computer-implemented empirical model development as the term is generally used herein.

In a next step S108 the computing system 100 prepares the historical data for use by a machine learning algorithm. Data preparation includes placing the data in a form, such as in sequential data records each of which comprises the same number of fields, that can be used by the machine learning algorithm chosen in the step S104. The fundamental role of data in empirical model development via machine learning means that the integrity of the data critically influences the quality, and therefore the utility, of the resulting model. While the data operated on by the algorithm is critically important in machine learning, a machine learning algorithm itself does not directly address issues affecting the validity/ integrity of the data used by the algorithm (for example, how invalid values for given data points should be handled). Some of the approaches used in the prior art to deal with such data issues independent of the machine learning algorithm are discussed further below.

In the next step S110 the model developer specifies the parameters to be used by the algorithm to process the data. For any particular algorithm, there are parameter values that govern the behavior of the algorithm, such as how long the algorithm will be permitted to run and what objective function will be used internally to measure performance. The algorithm parameters may be set based on the model developer's experience, published heuristics for the type of algorithm chosen, or possibly automatically by a general purpose optimizer such as a genetic algorithm.

In a step S112 the machine learning algorithm is trained on the computing system 100. In the terminology of the present invention the end result of this training is called the "primary model." In an exemplary embodiment discussed herein, the primary model generated by training the machine learning algorithm can be used to generate an output value (for example, a person's credit score) based on the individual data points available for that person. That is, the purpose of the primary model in that case would be to generate a credit score that most accurately represents the credit risk posed by an individual who was not represented in the historical data used to train the algorithm. Numerous machine learning algorithms for generating such results are employed in commercially available software and systems, such as that used to generate Fair Isaac Corporation's FICO® score.

The next step S114 evaluates the performance of the algorithm by comparing the output values (credit scores) generated by the algorithm for persons whose data was used in training with the corresponding actual credit scores included in the historical data. The nature of a satisfactory result is typically set by the model developer, based on characteristics of the problem domain and trade-offs between having a high level of performance and the cost of obtaining the performance via obtaining more training data or spending more time testing the effects of altering the algorithm parameters (per step S110). If the model meets the chosen criteria, the answer at decision step S116 is "YES" and the model is placed in service, as indicated at step S118. However, if the answer at step S116 is "NO," the process reverts to step S110 where new algorithm parameters are input and then proceeds as before through the steps S112 to S116. (Although not depicted in the drawing, the process can also include obtaining additional data at the step S106 and proceeding through the subsequent steps to the step S116.) The trained model can be used to generate an output value using any new set of data points organized in the same manner as the historical training data, but without target values, input through the computing system 100 executing the algorithm. (Although the discussion herein generally uses supervised machine learning for purposes of explanation, the systems and methods described throughout are also applicable to unsupervised learning.)

When applying machine learning algorithms to data produced by typical "real world" data sources, problems with the integrity and quality of the data abound. Such problems include, but are by no means limited to: data accidentally or deliberately omitted when forms are completed by humans, typographical errors that occur when humans transcribe forms and enter information into a computing system, and errors made when optical character recognition or voice recognition systems process raw data and convert it into a form suitable for use by machine learning algorithms. Hardware problems can also cause errors when data moves from a source (such as a sensor) to a repository (for example, a database). Sensors can fail and thus provide no data at all. The conduit for the data can be "noisy"-electromagnetic interference, simple corrosion of wire terminal connectors, or a faulty or damaged cable can all introduce artefacts-such that the data that is placed in a repository is not an accurate reflection of the information originally produced and transmitted. When faulty data are detected, the affected machine learning process essentially has only two choices: ignore the data (along with related possibly valid data acquired in the same context) or replace the data. Replacing a data point requires generating replacement values that are most likely to reflect what the "correct" value should be, so that all of the data, in context, can be used as intended.

Despite the critical importance of data quality in the empirical model (machine learning) development process and significant advances in the empirical modeling algorithms themselves, and considering the huge quantities of raw data now generated every second in systems around the world, there has been little progress in improving the quality of historical data that is to be used by machine learning algorithms to develop primary models of a phenomenon of interest. Likewise, the prior art has seen the same lack of progress in techniques for preparing new data to be used by a model after it has been placed in service. As used throughout herein, "missing data" refers to a field in a record (data point) that has no value. A more general term is "invalid data," which refers to data that is improperly represented (for example, a data value that is intended to be numeric that contains non-numeric characters), or data whose value exceeds limits established by the developer or administrator of the system that produced the data. Thus, the term "invalid data" includes "missing data"; likewise, "missing data" is "invalid data." In some instances, the terms are used interchangeably in this description, and those skilled in the art will understand the intended meaning from the context in which the term is used.

Some of the current approaches for dealing with poor quality data are discussed in a 2017 report by the UCLA Institute for Digital Research and Education (IDRE) entitled "Missing Data Techniques with SAS," available online at https://stats.idre.ucla.edu/wp-content/uploads/2017/01/ Missing-Data-Techniques_UCLA.pdf. Another source of prior art on preparing data for machine learning algorithms is Loely-Bori, M., "Dealing With Missing Data: Key Assumptions and Methods for Applied Analysis," Tech.

Rept No. 4, Boston Univ. School of Public Health, May 6, 2013, available online at http://www.bu.edu/sph/files/2014/05/Marina-tech-report.pdf. These documents are incorporated herein by reference in full for their discussion of prior art techniques for dealing with invalid data in a machine learning context.

The most simplistic approach for dealing with missing data is to ignore it. In other words if a field in a data record contains no value, the entire record is discarded (that is, not processed by the machine learning algorithm). Although easy to implement, this approach can have unacceptable ramifications when data quantity is also an issue (that is, when events of interest occur so infrequently that it is important to retain and utilize any data related to them). An alternate approach can be used if the invalid data are from a series of continuous numeric data points. This approach calculates a substitute value using other data in the same series (for example, the data points in the same column of an entire dataset organized in a tabular format). Thus, in a case where the data field is numeric, such as an individual's age, valid data points will be in a given range. Invalid data can be either no data for that field, or a number that obviously does not represent the age of an individual, such as 430. Instead of just ignoring this data point, the invalid value is replaced with the mean of the valid values in the same series, or the mode of the valid values in that series (the value that occurs most frequently), or the maximum value or minimum value of the valid data in that same series. In any case, using such methods for selecting replacement values are almost guaranteed to provide unsuitable values, but will at least prevent having to discard the entire record. The IDRE report discusses more complex replacement schemes, but they generally force an unwarranted assumption of linearity on the data in a particular series. While these techniques can be moderately effective when a data series is missing a single data point, they are more likely to introduce errors into the final model when used to replace multiple invalid data values in a particular data series.

All of these prior art approaches have the advantages of being mathematically feasible and relatively straightforward to implement. But their simplicity forces values onto missing data that may not be warranted by the related valid data taken as whole-either in the same column (field) or in the same row (record) as the missing data. These approaches especially tend to obscure the context provided by the valid data values in the same record as the invalid data. That is, the data values in any particular record will have some logical connection, such as a representation of the state of the system of interest or attributes of the entity represented by the record at a particular time. Accordingly, known approaches for replacing missing or invalid numeric data values in a particular data record generally fail to adequately take into account the logical and temporal relationships of valid data in the record.

Similar approaches have been used for non-numeric (symbolic or categorical) data. A typical approach for such data is to either use the mode of all "good" values, or to simply use the value zero. To this end, symbolic or categorical values would typically be transformed to "1-of-n" binary values, but in the case of invalid data, the n values would all be zero. As an example, consider a field for an individual's occupation, where throughout the dataset, the categories are "Attorney, "Engineer," "Manager," and "Physician." In this case, n is 4 and these symbolic/categorical values which occur in one column (field) would be transformed into four binary columns (fields), each of which contains either the value 0 or the value 1, before the data could be processed by a machine learning algorithm (thus, the size of a record would increase by three fields). "Attorney" would be transformed to 1 0 0 0; "Engineer" would be transformed to 0 1 0 0; "Manager" would be transformed to 0 0 1 0; and "Physician" would be transformed to 0 0 0 1. Consequently, if a missing or invalid value is transformed to 0 0 0 0, an algorithm can process the value mathematically, but that would be an inaccurate representation of reality and thus yield a suboptimal model.

The prior art is thus lacking a way of preparing data for a machine learning algorithm that accounts for missing or invalid data in a way that increases the ability of the model representing the algorithm to generate a more accurate and useful output when the model is placed in service. More particularly, improved systems and methods are needed to generate replacement values for invalid data values that account for the context in which the invalid values occurred, and as a consequence permit exploiting more fully the available historical data to create more robust models of the primary phenomenon of interest, and to produce a viable output when models that are already in service are presented with data that includes invalid or missing data values.

BRIEF DESCRIPTION OF THE DRAWINGS

The detailed description that follows below will be better understood when taken in conjunction with the accompanying drawings, in which like numerals and letters refer to like features throughout. The following is a brief identification of the drawing figures used in the detailed description.

FIG. 4, comprising

FIG. 5, comprising

FIG. 6, comprising

Figure 1:
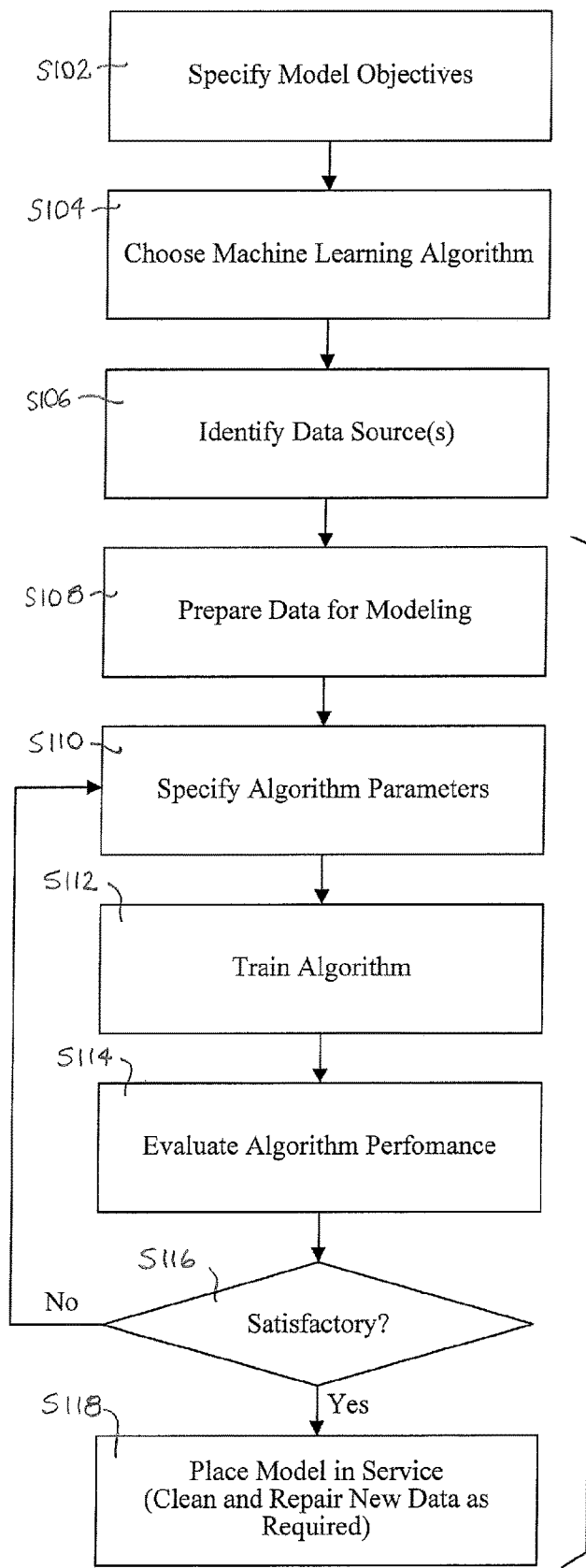
FIG. 1 depicts a flow chart of a conventional empirical modeling process and a computing system for applying a machine learning algorithm to a data collection for producing an empirical mathematical model.
Figure 1:
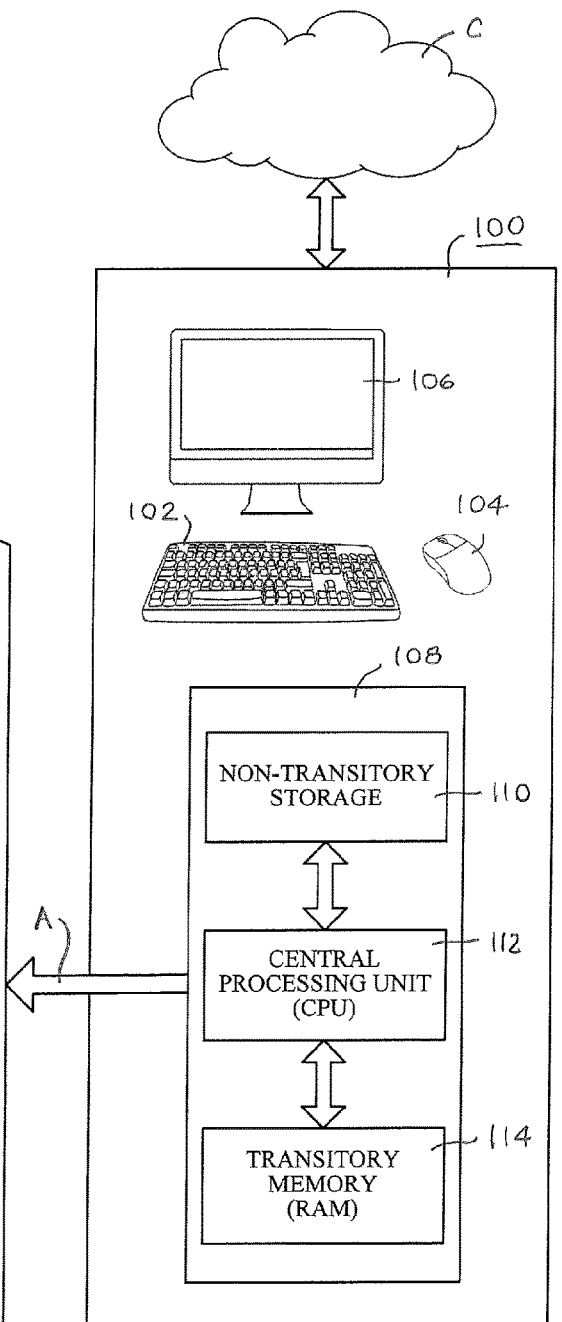

One skilled in the art will readily understand that the drawings are not strictly to scale, and are generally highly schematic in nature, but nevertheless will find them sufficient, when taken with the detailed description that follows, to make and use the systems and methods described herein.

SUMMARY OF THE INVENTION

It is an object of the present invention to provide improved systems and methods for preparing data for use in training a primary machine learning algorithm so that it achieves better performance after training with corrected historical data and when subsequently placed into service for processing new data that includes invalid values. Supervised machine learning is based on an assumption that one or more outputs of interest in a collection of historical data have a causal relationship with a plurality of historical data values associated with each of the plural instances of the historical output values.

Unsupervised machine learning discovers and identifies associations that represent clusters of interest in the plurality of data values in an historical dataset. In one aspect the present invention improves known systems and methods for replacing instances of missing or invalid data in historical data to improve the accuracy and utility of a primary machine learning algorithm developed using supervised machine learning to predict or classify a phenomenon of interest, or a primary machine learning algorithm developed using unsupervised learning to identify clusters of interest, when the primary algorithm is applied to new data.

One important aspect of the invention provides systems and methods that improve the accuracy and utility of the primary model machine learning algorithm by creating from existing valid values of the historical data one or more data-replacing models for generating imputed replacement data values to be substituted for the missing or invalid data in a manner that reflects the context of other historical data values related to the historical data defining an output of interest.

In another aspect of the invention the systems and methods described herein create one of two types of such data-replacing models for use in preparing data for a primary machine learning algorithm. A secondary model generates an imputed data value to replace a single missing or invalid data value in a data record, and a tertiary model generates a plurality of imputed data values to replace respective plural values of data in a data record.

One particular aspect of the present invention is used in a computing system for training a primary model machine learning algorithm using a base dataset with a plurality of historical data records each of which includes a plurality of data values. A computer-implemented method prepares the plurality of historical data records in a manner that increases the utility and accuracy of the primary model when the historical data records include invalid data. The method comprises segregating the base dataset into a faulty dataset having incomplete data records with invalid data values and a clean dataset having complete data records with no invalid data values. The method produces from the clean dataset one or both of a secondary model machine learning algorithm trained to generate from plural complete data records a replacement value for a single invalid data value in an incomplete data record, and a tertiary model machine learning clustering algorithm trained to generate from plural complete data records replacement values for multiple invalid data values in an incomplete data record. Augmented training data records are created by substituting the replacement data values for the respective invalid data values for at least some of the records in the faulty dataset. The primary model is then trained using the data records from the clean dataset combined with the augmented training data records.

Another aspect of the invention involves a method of using a computer-implemented primary model machine learning algorithm trained with historical data records, each of which includes plural fields containing data values, to generate an output of interest. The trained primary model generates a more accurate output of interest from a new data record with a plurality of fields corresponding to respective fields in the historical data when one or more of the fields in the new data record contains an invalid data value. To that end the new data record is completed using either a computer-implemented secondary model machine learning algorithm trained using the clean historical data records to generate a replacement value for a new data record with a single field containing an invalid data value, or a computer-implemented tertiary model machine learning clustering algorithm trained using the clean historical data records to generate replacement values for a new data record with multiple fields containing invalid data values. The primary model uses the completed new data record to generate the output of interest.

Another aspect of the invention involves the creation and storage of data structures or computer objects to facilitate the implementation by a computing system of the data preparation methods described herein and more particularly the use of the trained secondary model machine learning algorithm and tertiary model machine learning clustering algorithm to replace missing data values in data records to be processed by a primary machine learning algorithm. One such data structure comprises a field status data structure which maintains a compilation of the results of applying heuristics to each field in a data record, including the position in the data record of the field, an identifying indicia of the field (such as a name assigned to it), a status/elimination code indicating whether or not the data value contained in the field is useful in respect to training the primary model, and a code indicating the type of secondary model required (in a preferred embodiment, a secondary model is either a prediction type or a classification type).

A second data structure or computer object is used to determine which of the secondary or tertiary model a computing system will use to replace missing values in a data record presented to the primary model for processing. This data structure comprises a replacement model data structure with an entry in a first position that instructs the computing system to use the stored tertiary model clustering algorithm to generate replacement data values for data records that include more than one field with invalid data. Remaining entries of the replacement model data structure include information that enables the computing system to access the appropriate secondary model via the name of the model contained in an element of the entry thereby to generate a replacement value for a data record that has a single field with invalid data.

These and other aspects and features of the invention and embodiments thereof will be covered in more detail as this description proceeds. A Summary of the Invention is provided here solely to introduce in a simplified form a selection of concepts that are described in detail below. A further summary follows the below description of preferred embodiments and points out additional general and specific objects, aspects, and salient features of the systems, methods, and data structures disclosed herein. Neither the above Summary of the Invention nor the further summary below is intended necessarily to identify key or essential features of the subject claimed herein.

DETAILED DESCRIPTION OF PREFERRED EMBODIMENTS

The description that follows assumes a thorough understanding of the basic theory and principles underlying what is commonly referred to as "machine learning." It will be readily understood by a person skilled in the art of machine learning, neural networks, and related principles of mathematical modeling to describe examples of particular embodiments illustrating various ways of implementing the present subject matter.

Accordingly, certain details may be omitted as being unnecessary for enabling such a person to realize the embodiments described herein.

As those skilled in the art will recognize, in the description of the subject matter disclosed and claimed herein control circuitry and components described and depicted in the various figures are meant to be exemplary of any electronic computing system capable of performing the functions ascribed to them. Such a computing system will typically include the necessary input/output interface devices and a central processing unit (CPU) with a suitable operating system and application software for executing program instructions. In addition, terms referring to elements of the system are used herein for simplicity of reference. For example, the terms "component," "module," "system," "apparatus," "interface," or the like are generally intended to refer to a computer-related entity, either hardware, a combination of hardware and software (firmware), software, or software in execution, unless the context clearly indicates otherwise. In addition, the term "module" or "component" does not of itself imply a self-contained structure, but rather can include various hardware and firmware that combine to perform a particular function. In that regard, both an application running on an electronic computing device and the device itself can be a component. One or more components may reside within a process and/or thread of execution and a component may be localized on one computing device and/or distributed between two or more such devices.

Figure 2:
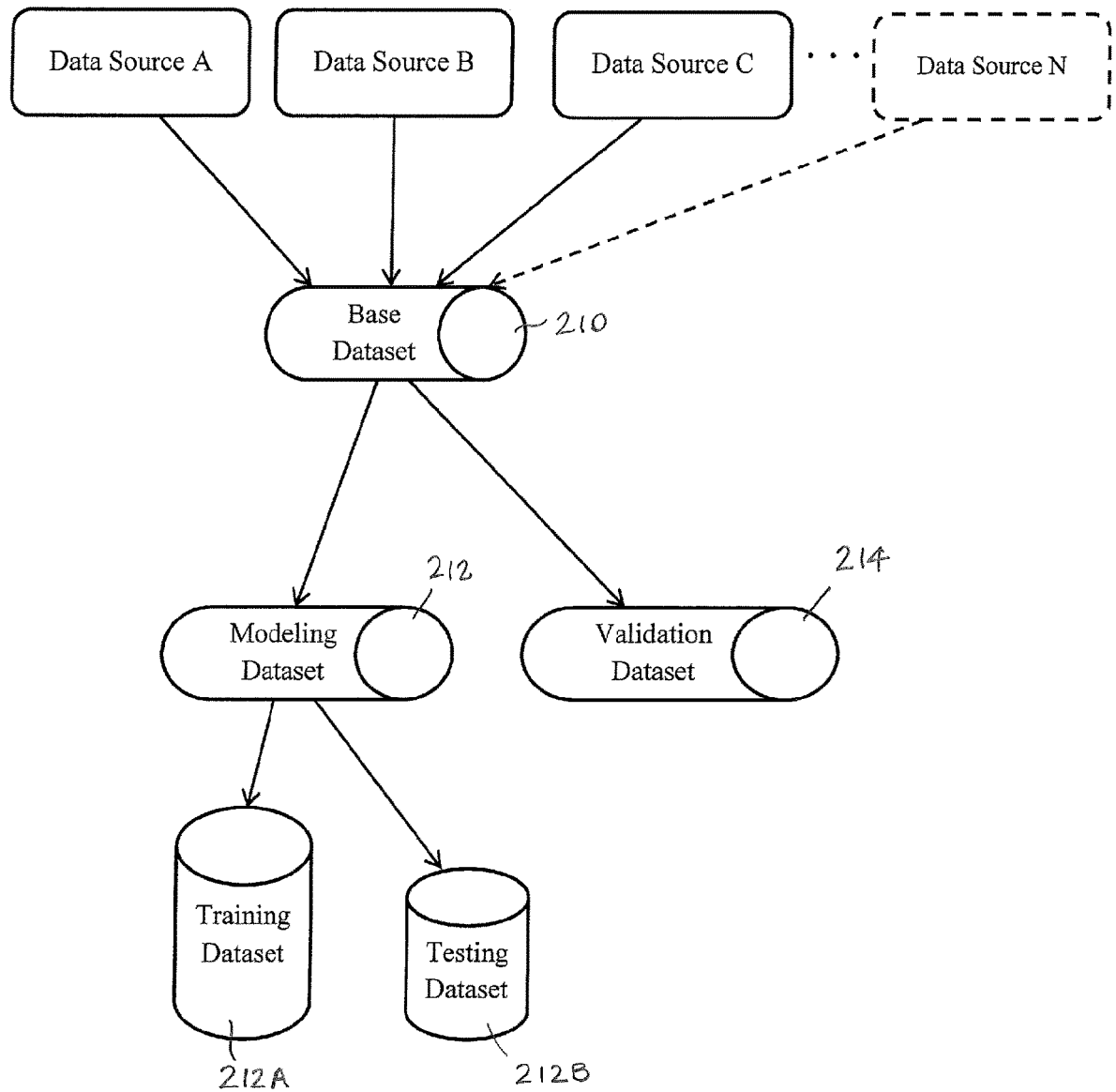
FIG. 2 is a representative overview of the organization of various datasets for use in developing a primary empirical model using machine learning.

FIG. 2 provides an overview of an exemplary prior art method that can be used to preliminarily partition data in a manner suitable for application of the present embodiment of the invention. Raw values of historical data presumed to be causally related to some phenomenon of interest are included in the data, which can be acquired from one or more sources A, B, C, . . . , N. Using the credit rating example mentioned above, the data sources could be drawn from the data records of one or more commercial credit rating companies on individual consumers, the phenomenon of interest being the data entry for the credit score of the individual associated with each row of data. If the data on an individual includes zip code or street address, census data can be retrieved to incorporate desired demographic information that can be associated with individuals in the same zip code. The data obtained from all sources is organized and placed in a base dataset 210 in the non-transitory storage 110 in the computing module 108 depicted in FIG. 1. The historical data will be used to develop a primary model for predicting, classifying or identifying associations (clusters) that reflect one or more phenomena of interest, as well as to develop secondary and tertiary mathematical models to increase the utility and accuracy of the primary model in accordance with an important aspect of the systems and methods described herein.

The base dataset 210 is optionally partitioned into a modeling dataset 212 and a validation dataset 214. The modeling dataset 212 is the dataset that is used in developing (training) a primary model. The validation dataset 214 is reserved for use in estimating how well the primary model will perform when it is placed into service in circumstances described in the next paragraph. Any known selection method can be used for partitioning the base dataset, examples being round-robin, or random selection, or putting more recent data records in the validation dataset 214. The quantity of data placed into each dataset 212 and 214 can vary, depending on the nature of the phenomenon of interest and the size of the base dataset 210; a typical partitioning would result in 70% to 80% of the available data being placed in the modeling dataset 212 and the rest (20% to 30%) being placed in the validation dataset 214.

During development of the primary model, if a supervised learning algorithm is employed, the modeling dataset 212 may be further partitioned into a training dataset 212A and a testing dataset 212B. As the supervised learning algorithm iterates through the training dataset, the values of various elements internal to the selected algorithm (such as the algorithm coefficients or weights) are adjusted according to the characteristics of the algorithm. Periodically, the performance of the supervised learning algorithm is evaluated by using the algorithm in its current state to process the testing dataset 212B, and in doing so, calculating the value of an appropriate performance metric, for example, the overall root mean square error between the phenomenon of interest (such as credit score) in the historical data and the output of the algorithm. This development step helps to prevent overfitting of the algorithm too closely to the training dataset 212A and compromising its ability to predict future observations. When the performance of the algorithm on the testing dataset 212B stops improving, the algorithm is considered trained and there are no further adjustments of algorithm weights or coefficients. The validation dataset 214 is used to estimate how well the primary model developed from the modeling dataset 212 will perform when placed in service and processes new data not contained in the modeling dataset. If during development of a primary model an unsupervised learning algorithm is employed, there are no target values, and the entire base dataset 210 is often used and training terminates after some number of iterations. In that case there is no partitioning of the base dataset into a modeling dataset and a validation dataset.

Further details of the initial structure of the data records and conventional preprocessing operations are explained with reference to FIG. 3. It will be understood that this description uses a limited number of data points for purposes of clarity, and that an actual data set can comprise thousands or even millions of rows (records) of data points that are assumed to have a causal relationship with a phenomenon of interest (included in each row as target values in the case of data for supervised learning), and that each row can contain hundreds or more data points (fields). In this simplified example, data source A comprises two data values denoted v1 and v2; data source B comprises four data values denoted v3, v4, v5, and v6; and data source C comprises four more data values denoted v7, v8, v9, and v10. The computing system 100's input/output devices (keyboard 102, mouse 104, monitor 106, etc.) and readily available commercial software are used by a model developer to effect the loading of data from disparate sources into the base dataset 210 in the non-transitory storage module 110 of the computing module 108 in a form appropriate for processing by the computing module 108.

Figure 3:
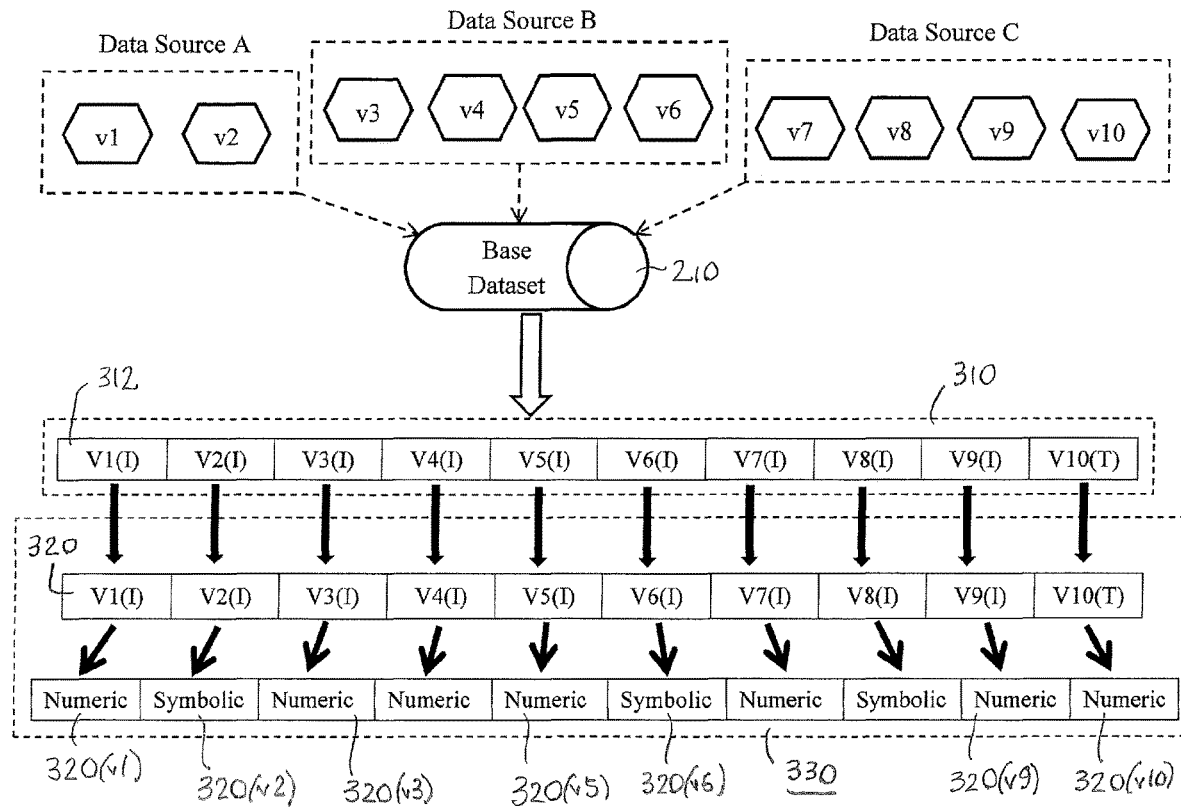
FIG. 3 depicts representative information about the structure of conventional data records and illustrates the results of an initial analysis of the available historical data records in preparation of the application thereto of systems and methods according to the present invention.

FIG. 3 illustrates conceptually how the discrete data values v1 to v10 are aligned contemporaneously and placed in the base dataset 210 in the form of data records containing fields having an initial organization 310 with multiple rows of data (1 to N), one of which rows is represented conceptually by the reference numeral 312. In this data structure, field values are identified as "vf," where "v" is the data value and "f" is the field (column) number in a record. In addition, field values identified by "(I)" are specified by the model developer as input values for the primary model. A field value identified by "(T)" is specified as the target value (that is, the phenomenon of interest) for that row. Applied to the credit score example referred to herein, the values v1 to v9 are historical information on a consumer and v10 is that consumer's credit score corresponding to his/her historical data v1 to v9 at a specific time. (If the primary model employs an unsupervised learning algorithm, target values are not specified.)

As indicated by the large arrow in FIG. 3, the initial structure 310 of the base dataset includes plural rows of data in the form 312, and in complex machine learning environments there may be hundreds of data fields, several of which may be target values, for each row, and thousands or more rows of data such as the row 312 comprising corresponding field values. In the present exemplary embodiment, if the primary model is a supervised learning algorithm, it will establish the empirical relationship among historical input values vf(I) which produce the historical target value vf(T). This will enable the algorithm to predict or classify the target value for any set of data values relating to an individual input to the model when it is placed in service. Alternatively, if the primary model is produced by an unsupervised learning algorithm, it will identify clusters of data records, identified by integer "node" numbers, that are similar; when placed into service the primary model will assign to new data records the node number of the cluster with which the new data record is most similar.

After the structure of data records is determined, the entire base dataset undergoes phase 1 processing, indicated by the solid arrows from each row 312 of the initial structure 310 of the base dataset 210 to a corresponding row 320 in a phase 1 dataset 330. This processing associates a data type for each field (that is, whether the field is expected to contain a numeric value or a non-numeric, symbolic value), as represented by the solid arrows from the data fields to the data-type indications 320(v1), 320(v2), 320(v3), . . . , 320(v9), and 320(v10) in FIG. 3. Phase 1 processing also discards data records in which a target value (if one is specified by the developer) is missing or invalid, since a record without a valid target value cannot be used to train the primary model. The determination of whether missing/invalid data in a particular field should be a numeric or symbolic value is based on heuristics. For example, if 99% of the valid values for a given field (say v5) are numeric, meaning that they can be directly converted to an integer or a floating-point number without error, then the field is considered a numeric field; otherwise it is designated a symbolic field. The result is the phase 1 dataset 330 comprising a plurality of N rows 320, as described more fully in the next paragraph with reference to FIG. 4. The phase 1 dataset is stored in the non-transitory storage module 110. (See FIG. 1.)

Figure 4A:
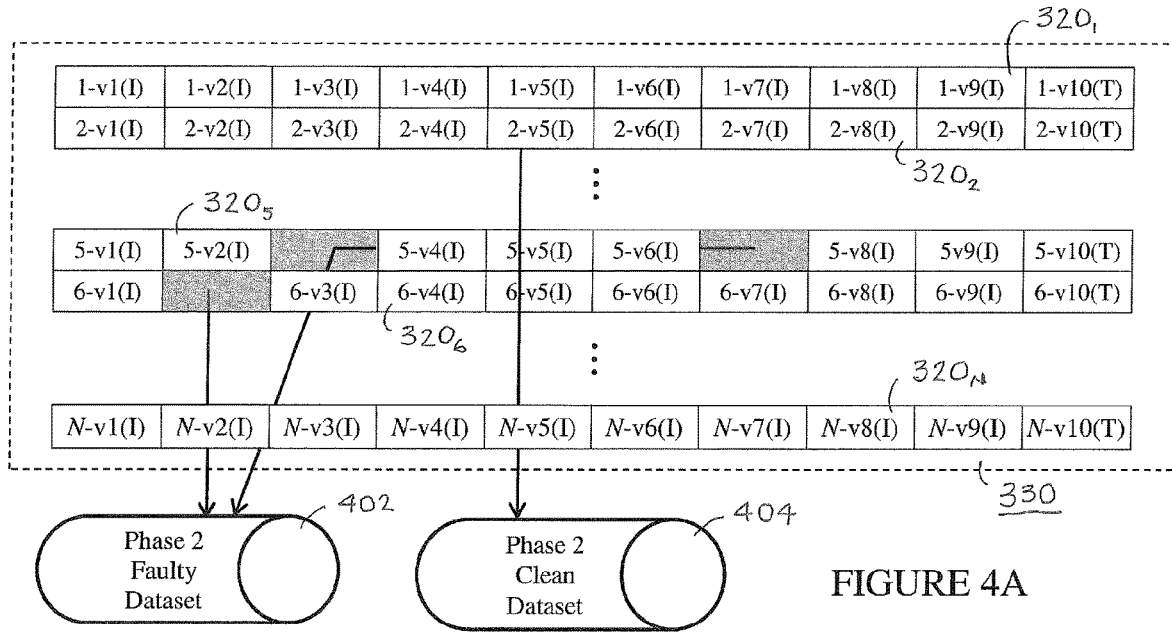
FIGS. 4A, 4B, and 4C, illustrates the result of segregating the data records that contain missing or invalid values from the data records that are complete and contain nominally valid values, and applying heuristics to yield a reduced clean dataset that eliminates from further consideration data fields not useful as inputs for developing a primary model in accordance with an embodiment of the invention as described herein.

FIG. 4A depicts the phase 1 dataset 330 conceptually as a matrix of N rows $320_1, 320_2, \ldots, 320_5, 320_6, \ldots, 320_N$, and K columns (K=10 in the present example), each of the columns representing one of the historical data fields, with the Kth column representing a field containing historical target value v10(T) (when K=10) associated with the other historical data values v1(1) to v9(1) in the same row (for those rows that include a target value). The phase 1 dataset 330 now undergoes phase 2 processing as depicted by the arrows in FIG. 4A. This processing analyzes all of the data records in the phase 1 dataset and places any data records, here rows $320_5$ and $320_6$, with missing or invalid values, illustrated by shaded fields in FIG. 4A into a phase 2 faulty dataset 402 in the non-transitory storage module 110 in the computing module 108. Various methods may be employed to identify missing or invalid data. In general, missing data is defined by two consecutive delimiters (for example, two commas in a comma separated value record) without an intervening non-delimiter value. Or, if a delimiter appears at the very beginning or the very end of a data record, the first or last, respectively, value in the data record is missing. Invalid data values may be values which contain alphabetic or symbolic characters when field values are expected to be numeric, or values that lie outside of a range of valid values for a field in a data record, as specified by a developer or an administrator. For efficient subsequent processing, all invalid values are set to have no value (that is, they become "missing" values) when placed in the phase 2 faulty dataset 402. Data records that are complete, such as rows $320_1$, $320_2$, and $320_N$, with no invalid or missing values, are placed into a phase 2 clean dataset 404 in the non-transitory storage module 110. The missing or invalid data values in the phase 2 faulty dataset 404 will be replaced to the extent possible in accordance with the present embodiment of the systems and methods described herein.

Figure 4B:
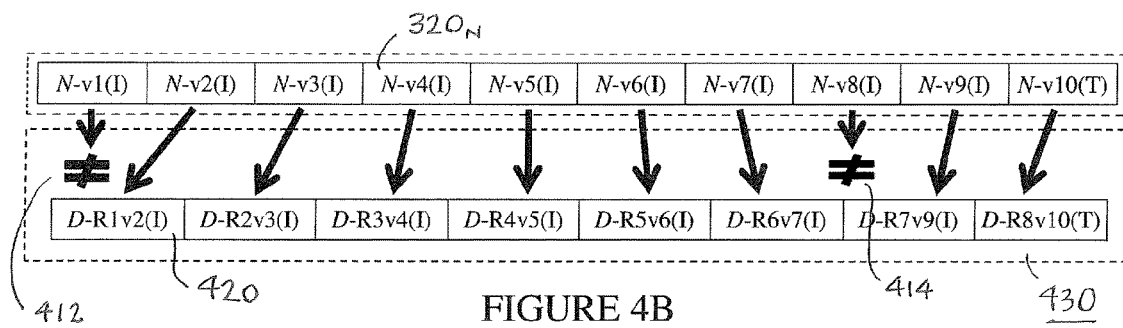

The phase 2 clean dataset 404 then undergoes phase 3 processing depicted schematically in FIG. 4B, in which statistics that describe the values found in all of the fields across the entire phase 2 clean dataset 404 are calculated, after which heuristics are applied to identify and eliminate fields that would not be useful for developing the primary model. The Nth (last) row $320_N$ reproduced in FIG. 4B is used as an example of the application of phase 3 processing to a row of data in the phase 2 clean dataset. The first example is column v1, in which the numeric data values indicate a sequence number, such as the value v1=1001 for record number 1, the value v1=1002 for record number 2, the value v1=1050 for record number 50, and so forth. A heuristic analysis would observe that these values are monotonically increasing by 1 and therefore eliminate field v1 from further consideration, as depicted at 412 by the symbol "*", since sequential values generally will have no causal effect on a target value nor would they be relevant to a cluster. Another example would be symbolic fields that have too many unique values. Say the value v8 was a social security number in its typical format (nnn-nn-nnnn, including the dashes), a heuristic analysis would eliminate data in column v8 from further consideration, as depicted at 414 by the symbol "≠", since a collection of unique sequences of characters comprising social security numbers would appear as random symbolic values to a heuristic and would have no causal effect on a target value nor would they be relevant to a cluster. Similar well known heuristics may be applied by the model developer to eliminate other fields from further consideration.

The remaining data values are converted as indicated by the arrows in FIG. 4B into a phase 3 reduced clean dataset 430 comprising D rows 420, as described more fully below with reference to FIG. 5. (The number of rows D is different from the number N in the phase 1 dataset because rows with invalid values are not included in the phase 2 clean dataset 404.) The terminology applied to this dataset is as follows: "D" is the row (record) number; "Rx" indicates that the value is in the reduced clean dataset 430 (which does not include the data values v1 and v8); the number "x" is the column (field) number of the data value in the reduced clean dataset; "vf" indicates the column number in the phase 2 clean dataet (as described above); and "(I)" denotes that the data is not a target value, which is denoted by (T). The phase 3 reduced clean dataset 430 is stored in the non-transitory storage module 110. (See FIG. 1.)

Figure 4C:
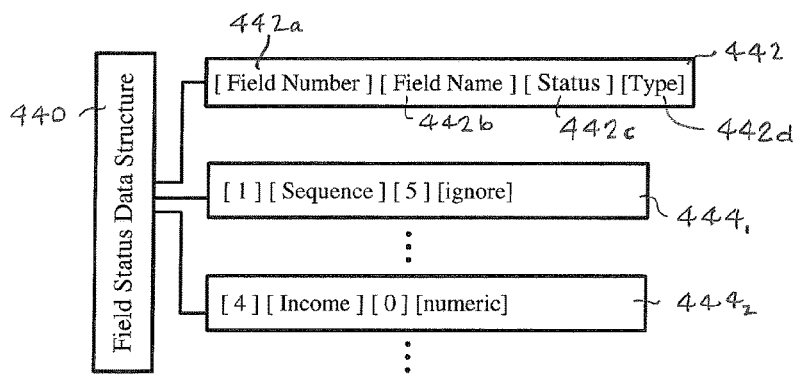

In association with phase 3 processing a field status data structure 440, an abstraction of which is shown in FIG. 4C, is constructed for each data field in the phase 1 dataset 330 and stored in the non-transitory storage module 110. Entries in the field status data structure 440 have the form depicted in the box 442, which indicates the generic information contained in an entry in the dataset structure. The "Field Number" 442a comprising the first element in an entry is a unique identifier indicating the position of the field to which the entry applies in a record (row) of the phase 1 dataset 330. The second element in an entry is the "Field Name" 442b, the third element in the entry is the field "Status" 442c as determined during processing to produce the reduced clean dataset 430, and the final element in the entry is the "Type" 442d of the field ("numeric" or "symbolic," or "ignore" if the field is eliminated during phase 3 processing). A first example entry $444_1$ in the field status data structure 440 indicates that field number "1" (v1) is associated with the field named "Sequence" in the dataset, and the status/elimination code "5" indicates that the field was eliminated from the reduced clean dataset because it was sequence information not useful to the machine learning algorithm, and the type is "ignore." A second example entry $444_2$ indicates how a field that was not eliminated in phase 3 processing is represented in the field status data structure: the field number is "4," the name of the field is "Income," the status of the field is 0 (where 0 represents the status code assigned to all fields that were not eliminated during phase 3 processing), and the type is "numeric."

In a concrete software implementation of the field status data structure 440, the required elements of an entry may be combined in a single software object that is stored for a single field, or each individual element of an entry may be stored in an array of items of the same type, whereby information pertaining to a specific field is available at the location corresponding to the field number in each array of the elements related to the field. The central processing unit CPU 112 of the computing system 100 will use the information in the field status data structure 440 to determine whether a secondary model must be created to provide a replacement value for the field when a valid data value is missing, and the type (prediction or classification) of the secondary model, as described further below. To produce the reduced clean dataset 430, each record in the phase 2 clean dataset 404 is processed one final time, during which the elements of the field status data structure 440 are referenced for each field, and each field with a non-zero status value is not included in data records assembled for the reduced clean dataset 430. Since the field does not appear in the reduced clean dataset, a secondary model for the field, described below, will not be created.

Figure 5A:
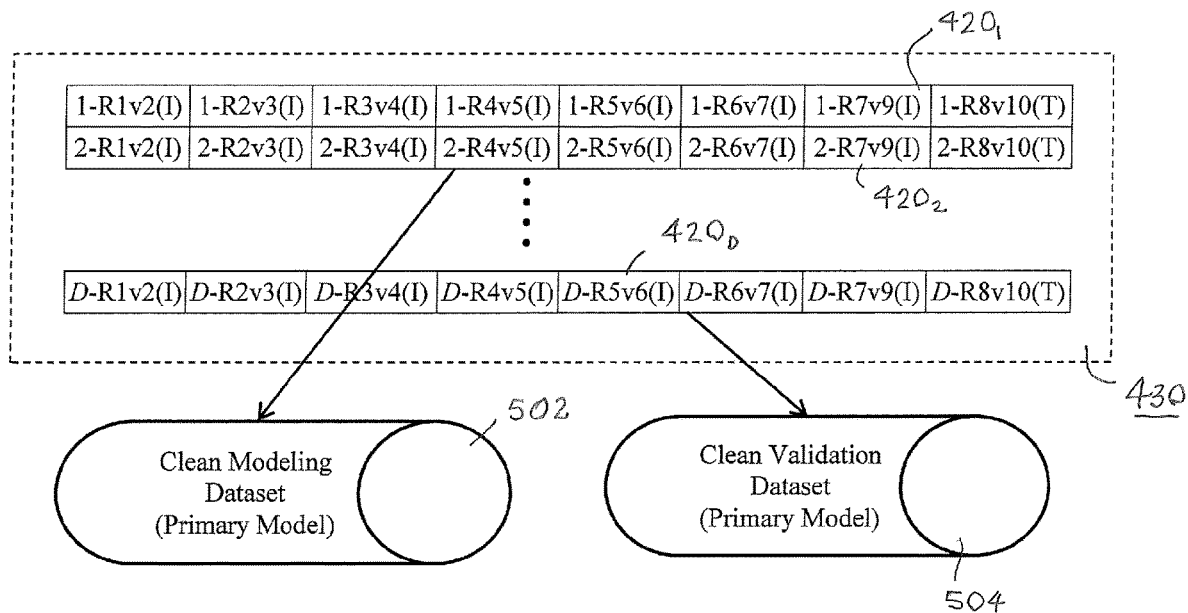
FIGS. 5A and 5B, illustrates the partitioning of complete and nominally valid data records in the dataset created by the processing depicted in FIG. 4B, for use in developing a primary model (FIG. 5A), and for creating a separate auxiliary clean dataset (FIG. 5B) comprising nominally valid data records containing only fields designated as inputs for the primary model for use in developing secondary and tertiary models for generating replacement values for single or multiple instances, respectively, of missing/invalid data.
Figure 5B:
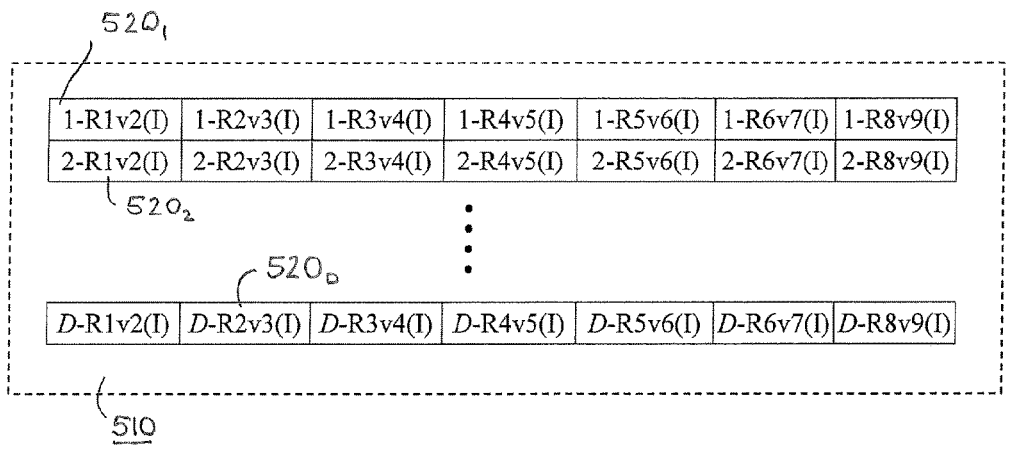

FIG. 5A depicts the results of processing the phase 3 reduced clean dataset 430 according to the next phase of the present embodiment. Data records $420_1, 420_2, \ldots, 420_n$, in the reduced clean dataset 430 are partitioned into a clean modeling dataset 502 and a clean validation dataset 504, in the fashion described above in connection with FIG. 2, for use in developing a primary model in accordance with the present embodiment A typical partitioning would place 70% to 80% of the available data records (rows) into the clean modeling dataset 502, with the remaining data records being associated with the clean validation dataset 504. As discussed, the actual partitioning can be performed using any common selection technique such as round-robin or random selection without replacement. FIG. 5B depicts an auxiliary clean dataset 510 comprising rows $520_1, 520_2 \ldots, 520_n$, which correspond to their respective counterpart rows 420, but without the R8v10(T) target fields. The auxiliary clean dataset 510 is used for developing secondary and tertiary models used to provide data field replacement values as described below. Depending on the size of the reduced clean dataset 430 and the judgement of the model developer, all of the data records in the reduced clean dataset 430 (excluding fields designated as target fields for the primary model) can be placed in the auxiliary clean dataset 510, or the data records in the dataset 430 can be further partitioned into modeling and validation datasets (not shown) so that estimates of secondary model performance, to be described, can be computed via the validation dataset.

Figure 6A:
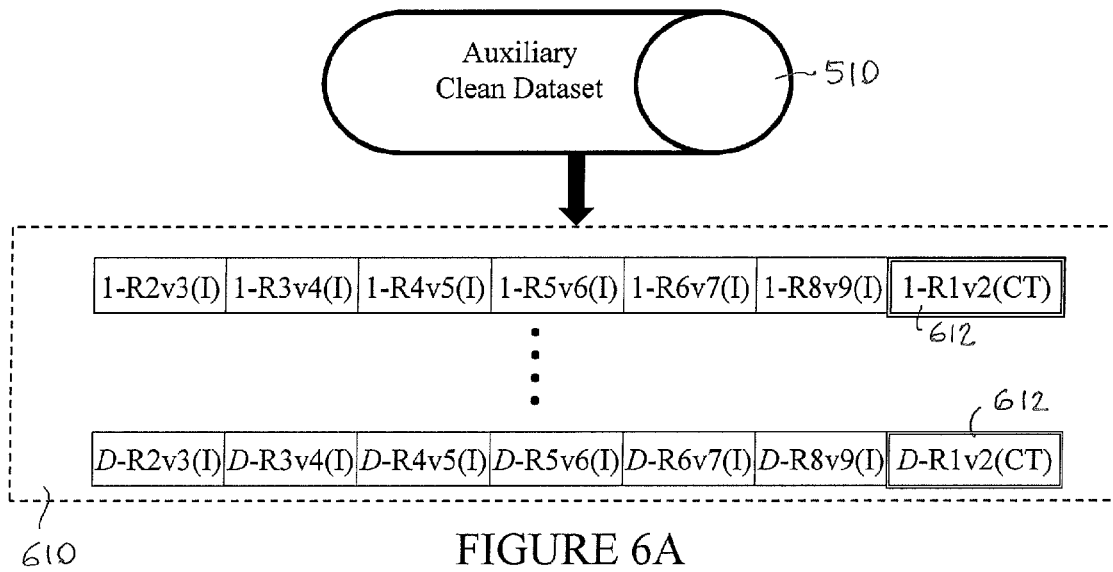
FIGS. 6A and 6B, illustrates the structure of data records used to train two examples of secondary models for replacing single instances of missing/invalid data in a particular record.
Figure 6B:
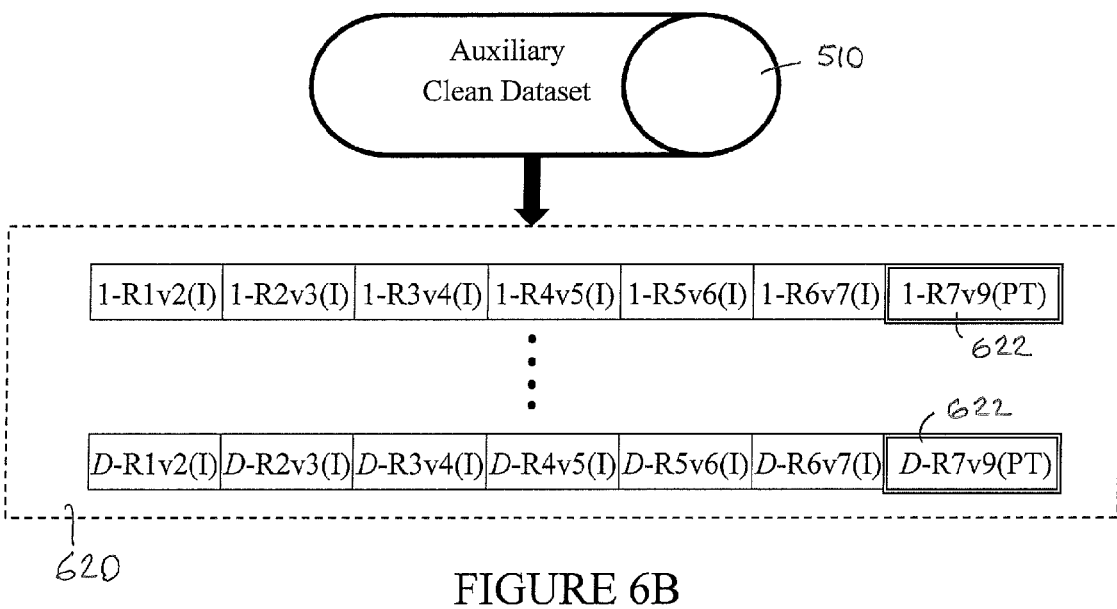

FIG. 6, comprising FIGS. 6A and 6B, describes the creation of secondary models used for replacing data field values in rows where only a single field is missing/invalid. The number of secondary models for a given base dataset 210 is equal to the number of fields in the auxiliary clean dataset 510, which is also the number of input fields for the primary model. In a secondary model training record from the auxiliary clean dataset 510, one field is temporarily specified as a training target value, and the remaining fields are specified as training input values, to form a training record for a particular secondary model. The type of each secondary model (prediction or classification) is determined by the type of the field selected as the training target for that particular secondary model, contained in the type element 442d of the corresponding entry in data structure 440. FIG. 6A depicts the structure of a training record 610 for a classification model for the original field v2 (identified in FIG. 3 as a field containing symbolic values, and accordingly having a type 442d of "symbolic" in the corresponding entry of data structure 440), where R1v2 (reduced-record field R1 representing historical data value v2) is the target value 612 represented by the notation (CT), indicating a classification target.

FIG. 6B depicts the structure of a training record 620 for a prediction model for the original field v9 (identified in FIG. 3 as a field containing numeric values, and accordingly having a type 442d of "numeric" in the corresponding entry in data structure 440), where R7v9 (reduced-record field R7 representing historical data value v9) is the target value 622 represented by the notation (PT), indicating a prediction target.

The form of machine learning algorithm used to create the secondary models is chosen by the model developer. In a preferred embodiment the secondary models are multi-layer feed-forward neural networks trained by back-propagation. An example of a basic algorithm of this type suitable for creating the secondary models is discussed in the Wikipedia entry "Feedforward neural network" (https://en.wikipedia.org/wiki/Feedforward_neural_network), which is incorporated herein by reference. It will be clearly understood that other types of algorithms known to those skilled in the art of machine learning and artificial intelligence can be used to create secondary models consistent with the discussion herein. At the conclusion of training, each secondary model, which contains all of the information needed to execute the model using a new data record, is stored in a data structure in the non-transitory storage 110. As each secondary model is created, it is named using a consistent convention. In a preferred embodiment the name comprises a term that identifies the purpose of the primary model, with information appended to indicate the position of the corresponding field in a data record 320 and the position of the field in an input record 420 for the primary model. For example, a secondary model named "Credit_F002_M001" would be a model for field no. 2 (F002, value v2, FIG. 3) in a data record that is mapped to input no. 1 (M001, the first position R1 in the dataset 430, FIG. 4B) in a primary model created for a credit-related phenomenon of interest. This secondary model name is placed in a replacement model data structure, described in more detail below with reference to FIG. 8.

Figure 7:
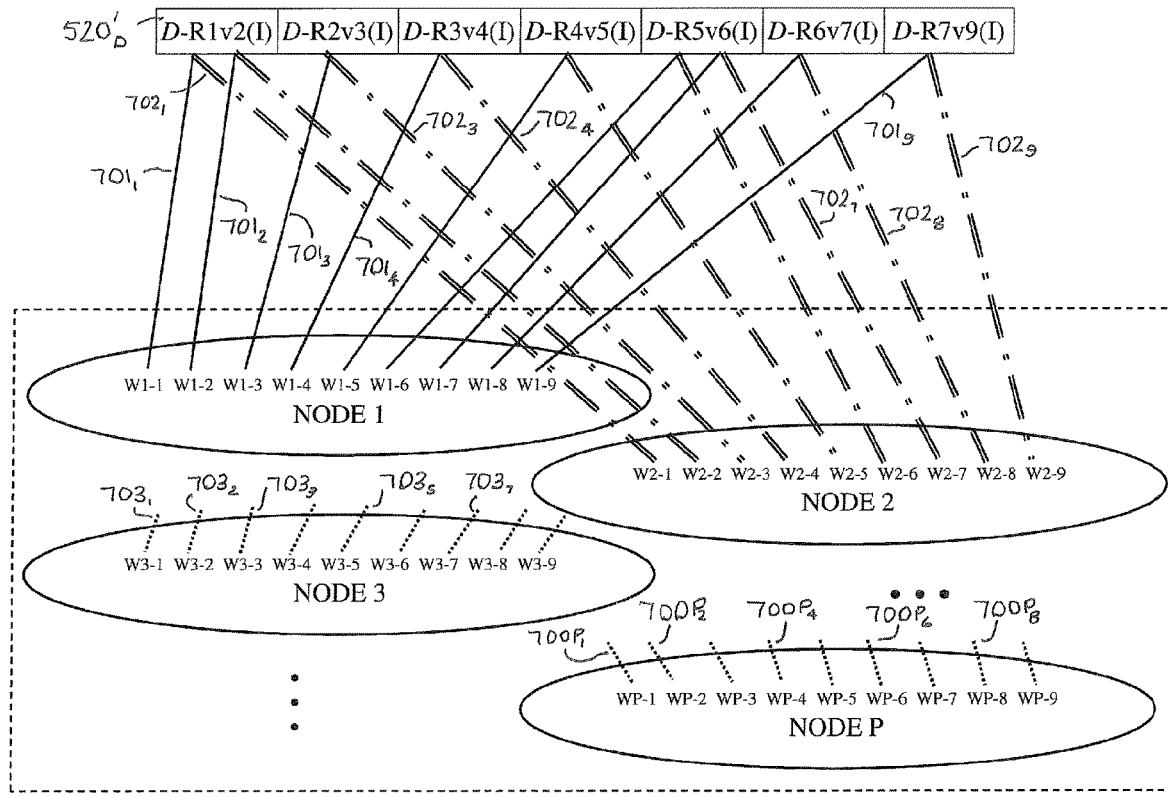
FIG. 7 illustrates one embodiment for training a self-organizing map for use as a tertiary model for replacing multiple instances of missing/invalid data in a particular record.

FIG. 7 illustrates a process for training a tertiary model and retaining information about the training results. A preferred embodiment for a tertiary model is a Kohonen Self-Organizing Map (T. Kohonen, *Self-Organizing Maps*, 3$^{rd}$ Edition, Springer-Verlag 2001). Other references describing aspects of self-organizing map algorithms suitable for training a tertiary model such as that described herein include J. Brownlee, *Clever Algorithms*, 1$^{st}$ Edition, Jason Brownlee 2011 (section 8.6 at pages 336-342), and J. Tian, et al., *Anomaly Detection Using Self-Organizing Maps-Based K-Nearest Neighbor Algorithm*, European Conference of the Prognostics and Health Management Society (2014), all three of which are incorporated herein by reference for background information regarding clustering algorithms that can be used to implement the present embodiment of the invention. The data records $520_D$ in the auxiliary clean dataset 510 (see FIG. 5B), transformed as described below, are used for training the tertiary model of this exemplary embodiment. Those skilled in the art will recognize that the construction of a tertiary model can employ any suitable clustering algorithm capable of autonomously using plural training data records to adjust the set of weights that define the cluster. This set of weights is sometimes referred to in the art as the "centroid" of the cluster.

To clarify the application of a particular algorithm to train a tertiary model in accordance with the present embodiment, the term "node" is used in place of the more general "cluster" as a way of identifying a set of data records the algorithm has deemed to be similar. A node is defined mathematically by the values of its weights and is identified by an integer number. During the algorithm training process, data records are "assigned" to a particular node, identified by number, based on a similarity calculation that uses the weights of the nodes. Node weights are designated in FIG. 7 by the notation "Wp-y," where p is the node number and y designates the number of the weight W in the node. For example, the weight W1-3 is the third weight value in node no. 1. The degree of similarity of a particular record $520_D$ in the auxiliary clean dataset 510 to a node's weights is calculated by a similarity metric such as the Euclidean distance between any two d-dimensional vectors X and Y in a d-dimensional space, defined as $[(X_1-Y_1)^2+(X_2-Y_2)^2+ \ldots +(X_d-Y_d)^2]^{1/2}$. Initial values for the weights representing each node are chosen randomly and range from −1.0 to +1.0. The number of weights W in a node (that is, the "dimensionality" of the problem space) is equal to the total number of transformations, as described below, for a particular data record. Thus, all of the tertiary model training data records have the same number of transformed values, and the number of weights in each node is the same as the number of transformed values in a tertiary model training data record. The number of nodes or clusters in a particular tertiary model, designated by the letter P in FIG. 7, is typically determined using heuristics based on the number D of data records in the auxiliary clean dataset 510. For example, the Tian article cited above suggests using 5*[√(number of records)] to calculate the total number of nodes in a self-organizing map algorithm.

During tertiary model training, each individual training data record has a structure corresponding to the structure of a data record $520_D$ in the auxiliary clean dataset 510. However, in order to calculate a mathematical similarity metric, symbolic values must be transformed as described earlier into 1-of-n numeric values. The values v2 and v6 in the present embodiment are symbolic (see FIG. 3). Here, each of those fields is assumed to contain one of two unique symbolic values, and thus each field is represented by two transformed values. For a specific symbolic value, one of the transformed values would be "0" and the other transformed value would be "1." This feature of the tertiary model is indicated in FIG. 7 by the correspondence of the value v2 to the weights Wn-1 and Wn-2, and the value v6 to the weights Wn-6 and Wn-7. Numeric values v in a data record are likewise transformed (scaled) so that their ranges are −1.0<v s+1.0. The resulting training data record with transformed values has the same number of values as there are weights Wx-1 to Wx-9 (or as sometimes used herein, Wx1 to Wx9 for ease of reference) in each node of the tertiary model.

The next step in constructing a tertiary model map comprises individually subjecting every transformed data record in the auxiliary clean dataset 510 to iterative processing. This involves calculating the similarity metric using the weights of each node and the values of each scaled transformed data record, indicated in FIG. 7 using a prime (') to denote that data records $520_1$ to $520_D$ as shown in FIG. 5B, been transformed and scaled in accordance with the above discussion. As stated, the present example has P nodes, and the similarity metric is calculated for each clean, transformed data record $520_1$' to $520_D$' with respect to each node P. The calculation of the similarity metric for a particular data record with respect to node no. 1 is represented by the solid lines $701_1$ from the input field transformations to the corresponding node weights in node 1. (For clarity, only the lines $701_1$, $701_2$, $701_3$, and $701_9$ are labeled in FIG. 7.) The double dot-dash lines $702_1$ from the input field transformed values to corresponding node weights in node no. 2 represent the calculation of the similarity metric between the same transformed data record and the node weights in node no. 2. (For clarity, only the lines $702_1$, $702_2$, $702_3$, $702_4$, $702_7$, $702_8$, and $702_9$ are labeled in FIG. 7.) The single dot lines 703 (with subscripts "i" denoting the corresponding weight value W) associated with node no. 3 and the single dot lines associated with the node P, some of which are not labeled for clarity, represent the calculation of the similarity metric for those nodes with respect to the data record under consideration. If the similarity metric is Euclidean distance, the calculations would be according to the equation $[(v2_{trans1}-Wx1)^2+(v2_{trans2}-Wx2)^2+(v3-Wx3)^2+ \ldots +(v9-Wx9)^2]^{1/2}$, where $v2_{trans2}$ and $v2_{trans2}$ denote the transformed values for the original value v2 of field 2. There would likewise be two values $v6_{trans1}$ and $v6_{trans2}$ to denote the transformed values for the original value v6 of field 6.

After the similarity metric is calculated between the current data record under consideration (that is, one of the data records $520_1'$ to $520_D'$) and all of the nodes, the node which is "closest" to the data record (has the smallest Euclidean distance) is considered the most similar and is declared the "winner." Then, the values of each of the weights for the winning node, as well as neighboring nodes as identified by a neighborhood shape such as a circle or a square, are adjusted according to a learning coefficient so that the distance between each node centroid within the neighborhood and the data record is reduced, in accordance with known techniques used to implement self-organizing map algorithms. This process is repeated for a specified number of iterations (based on a heuristic such as 1000 times the number of fields in each transformed record), or until the respective weights of all nodes have converged. Convergence can be defined in various ways known to those familiar with machine learning. An example would be to iterate until the squared distance between the current weights of any node and the previous weights of the node is less than the square of a predetermined threshold value specified by the model developer. The inventor has used a threshold value of 0.1% of the maximum possible Euclidean distance between any two nodes in the set of nodes, although other values may be used depending on the number of training records. In general, the convergence threshold is a proxy for a stable map; when weight adjustment values are below the threshold, tertiary model training will terminate even if the specified number of iterations has not been reached.

When tertiary model training terminates, information about the tertiary model is placed in a data structure and stored in the non-transitory storage module 110 in the computing system 100. This information includes the types of transformations applied to field values and the final values of the weights for each node in the tertiary model. An additional value comprises the rate/frequency each node was declared a "winner." This value is determined by incrementing a node-specific counter each time a particular node is declared a winner during model training, and dividing the final value of the counter for each node by the product of the total number of training data records that were processed, which in the present example is the number D of data records in the auxiliary clean dataset 510, times the number of actual iterations through the dataset (to account for the possibility of training termination as a consequence of convergence). If a particular node is never most similar to any data record, its weights are never adjusted, the value of the counter for the node is zero, and its winning frequency is zero.

Figure 8:
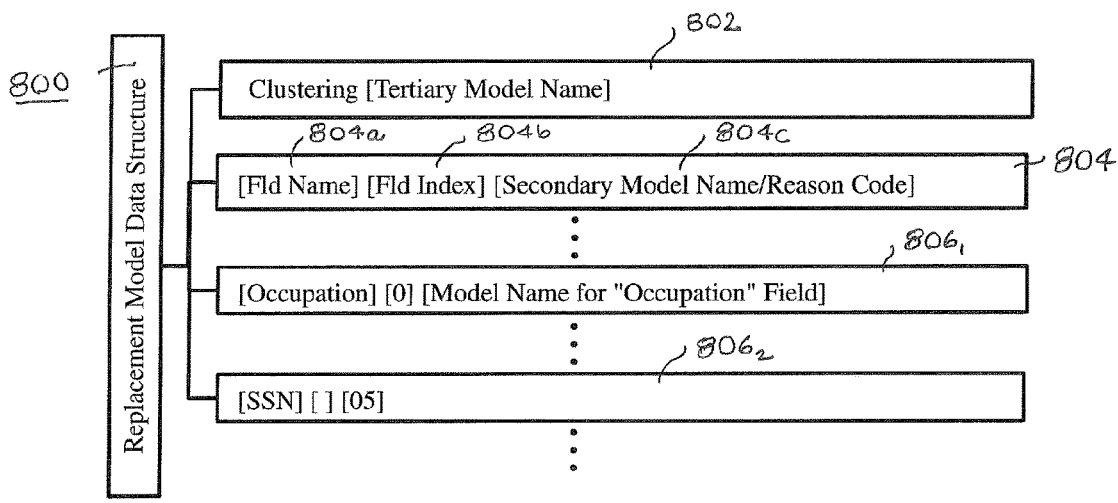
FIG. 8 illustrates the elements of a data structure which is used to identify the appropriate secondary or tertiary model to use when replacement data values are required to complete a particular record.

FIG. 8 describes a replacement model data structure 800 that is stored in the non-transitory storage 110 to efficiently maintain information about secondary and tertiary models that can generate replacement values for invalid or missing values either in historical data records used for training a primary model or in new data records introduced to the computing system for processing by a primary model after the model is placed in service. The replacement model data structure includes information previously placed in the field status data structure 440 described above in connection with FIG. 4C. It may also contain administrative information, such as an entry that contains a copyright notice, an entry that contains a default location for the secondary and tertiary model data structures stored in the non-transitory storage 110, and entries that contain other information. The replacement model data structure 800 is created by the computing system 100 during the data preparation step S106 in FIG. 1 as the computing system implements the methods described herein.

In one embodiment the replacement model data structure 800 is stored in JSON (Java Script Object Notation) format. To ensure that the replacement model data structure is not modified inadvertently or maliciously, a signature such as an MD5 or a SHA-256 hash signature can be generated and appended to the data structure at the time it is generated. The data structure can then be validated by the computing system when the replacement model data structure and secondary and tertiary models are deployed and the models are executed (as described below). This adds a level of security when implementation is effected either on the original computing system 100 or on a computing system different from the computing system on which the models and data structure were generated.

At a minimum, the replacement model data structure 800 will contain sufficient information for the computing system 100 to apply the appropriate secondary model or tertiary model to a data record presented for processing by the primary model, when one or more fields in the data record contain invalid values. In the present embodiment the data structure 800 has a first entry 802 that contains the name of the tertiary model, which in the present example is "Clustering," that preferably reflects the type of algorithm used to produce the tertiary model. Additional entries in the generic form indicated in the box 804 correspond to each input field of a data record organized as shown in FIG. 3 in the base dataset 210. For each additional entry, (a) the "Fld Name" (field name) element 804a contains the name of the field to which the entry corresponds, as associated with the field in data records in dataset 210; (b) the "Fld Index" (field index) element 804b indicates the zero-based position of the field's value in an input data record 520 for the primary model (where the relative order of fields in a record 320 is maintained in the corresponding locations in the record 520), or is empty if the field was eliminated during phase 3 processing (FIG. 4B); and (c) the final element 804c either (i) indicates the name of the secondary model to use to generate a replacement value for the field or (ii) comprises a code that indicates the reason the field was eliminated during phase 3 processing (FIG. 4B). The computing system uses the field number (see FIG. 4C), which identifies a field in a data record 320, to access the appropriate entry in the replacement model data structure 800, and in turn the element 804c of the entry, which contains either the name of the secondary model created for the field, or a code indicating that the field was eliminated and not used by the primary model (corresponding to status/elimination code 442c in FIG. 4C).

For example, in the present embodiment as illustrated in FIG. 8, the entry $806_1$ in data structure 800 corresponds to field 2, whose values were not eliminated during phase 3 processing, in a data record 320. The entry contains "Occupation" as the field name element 804*a*, the field index element 804*b* contains 0 (corresponding to position R1 in records 520 for use by the primary model), and element 804*c* contains the name of the secondary model created to generate replacement values for field 2 as described previously with in connection with FIG. 6 (in the present example, Credit_F0002_M001). If a data record in the form 320 (FIG. 3) is presented for processing by the primary model, and the data record is missing only the value for field 2, the computing system will access the entry in data structure 800 corresponding to field 2, use the secondary model for field 2 to process all other values of input fields in the data record 320 that were not eliminated in phase 3 processing to generate a replacement value for field 2, and then combine the replacement value of field 2 with the values of other non-eliminated input fields from data record 320 to prepare a complete data record 420 for use in training the primary model, or a complete data record 520 for processing by the primary model.

If a field in a data record presented for processing by the primary model was eliminated in phase 3 processing (FIG. 4B), the field's corresponding entry 806$_2$ in data structure 800 will contain the field name 804*a*, such as the name "SSN" (denoting a social security number) given to field 8; the field index 804*b* will be empty; and instead of a model name 804*c* there will be a code (in this example "05") indicating that the field N-v8(I) was eliminated (see FIG. 4B). One of multiple code values may be assigned for this field as a result of the processing described in FIG. 4B, where each value indicates a specific reason that the field was eliminated, or there may be one global code value that simply indicates that the field was eliminated for an unspecified reason. When the replacement model data structure 800 is used in the data preparation systems and methods described herein, information about secondary and tertiary models in the data structure 800 is loaded from the non-transitory memory 110 and placed in a list (array) stored in the transitory memory RAM 114 for fast access by the CPU 112 in the computing module 108.

In a preferred arrangement for enhancing efficient and unambiguous access to the correct model when required, the name of the tertiary model from data structure element 802 is placed in the first position (list index value "0") in the list loaded into the transitory memory 114. The tertiary model is not associated with any specific individual field, so only its name is necessary. Information about each field in a data record 320, including the secondary model name or an elimination reason code, is placed data structures of the form 804. The data structures for all of the fields are then placed in the transitory memory 114 in list positions (indices) 1 through F, where F is the number of fields in a data record with the structure 320 in FIG. 3 (F=10 in the example used herein). If a particular field was designated a target field T, the corresponding data structure 804 for that field is placed in list position TL. It is given an empty index value for data structure element 804*b*, and instead of a reason code or secondary model name, the label TARGET is used in data structure element 804*c*.

If a field E, where E can be a number from 1 to F (but not TL), was eliminated from further consideration during the phase 3 processing described above, the corresponding data structure 804 for the field is placed in list position EL. It is given an empty index value for data structure element 804*b*, and instead of a secondary model name, the code for the reason the field was eliminated is used in data structure element 804*c*. In a preferred embodiment, codes formatted as 2 digits will typically be used to indicate the reason a field was eliminated so that the reason codes will always have a small and fixed number of characters. Thus, the reason code "5" in in a data structure element 442*c* (FIG. 4C) would actually be formatted as "05" when it is placed in the data structure element 804*c*. The convention described above for naming secondary models as they are created (for example, "Credit_F002 M001) ensures that the secondary model names always have more than two characters. This provides an efficient mechanism to determine whether or not a field is used by the primary model. That is, if the length of the element 804*c* of a data structure is 2, the field number F, which corresponds to the position in the list of the data structure 804, is not used by the primary model and therefore it is not necessary to generate a replacement value if a data record 320 does not contain a value for the field. If the length of the model name portion of a data structure element 804*c* is greater than 2, and the index portion is not empty (meaning the field is not a target field), a model exists to generate replacement values for the given field, and can be used when only that one field value is missing in a data record 320.

In summary, specific instances of generic data structure component 804 (that is, entries in the list in transitory memory 114 that corresponds to data structure 800) contain the name of the field and also indicate, by virtue of their position in the list, the 1-based field number which reflects the position of the field in a data record 320 (recall that entry "O" in the list in transitory memory refers to the tertiary model, so that entry 1 in the list contains information for field 1 of a data record 320, entry 2 contains information for field 2, and so forth). The index value 804*b* contained in the data structure 804 in the list indicates the position where the primary model expects the field value in a new data record intended for processing by the primary model. The data preparation system can use the field identification information in an entry in the list to resolve ambiguities and properly organize field values in the correct order for use by the primary model if a set of data records, which contain appropriate field values but not in the order required by the primary model, are presented to the data preparation system to be validated for use by the primary model. In other words, the list of data structure entries 804 (that is, 806$_1$, 806$_2$, etc.) in the transitory memory 114 serves to map fields from a data record with the structure 320 to input fields with the structure of a data record 420 (FIG. 4B) if the data record is for training a primary model, or to input fields with the structure of a data record 520 (FIG. 5A) if the data record is for processing by the primary model after it is placed in service. In various alternate approaches, tree maps, hash maps, linked lists, etc., that provide direct random access to data through an index or a "key" value could be used to provide the basic functionality of the data structure 800 in transitory memory, rather using a list (array) as discussed in the present embodiment.

Figure 9:
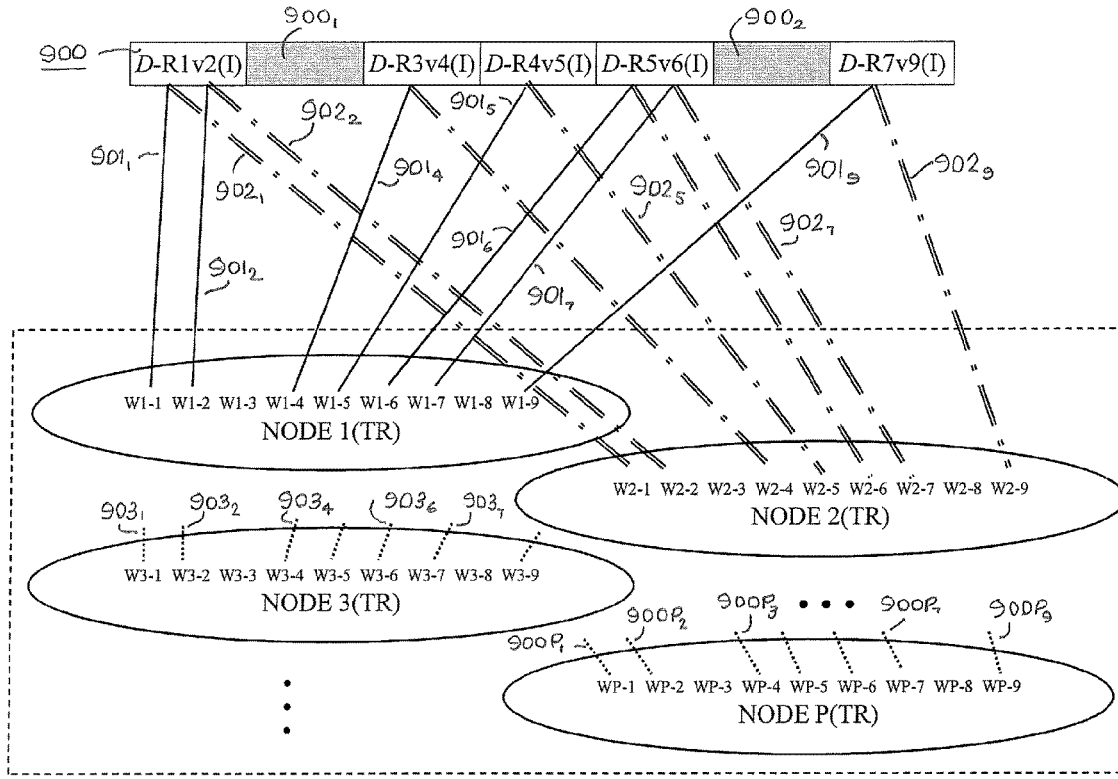
FIG. 9 illustrates one embodiment for identifying potential replacement values for a record with two missing/invalid data values by using the tertiary model trained in accordance with FIG. 7.
Figure 10:
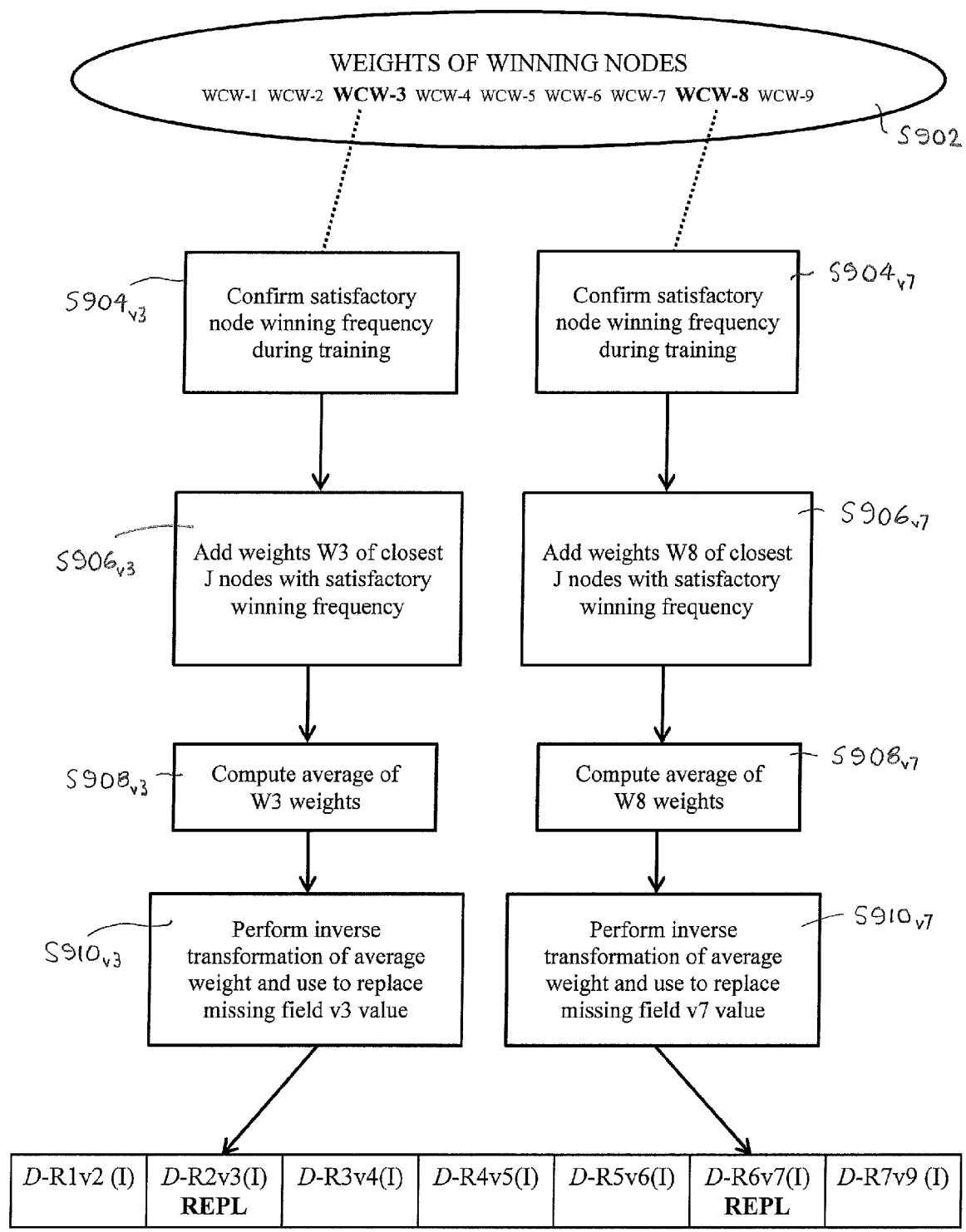
FIG. 10 describes a process for generating a replacement data value for each of multiple instances of missing/invalid data in a particular record using the potential replacement values identified in accordance with FIG. 9.

The use of the secondary and tertiary model to generate replacement values for missing or invalid data will now be described. FIGS. 9 and 10 will be used to describe how the tertiary model trained in accordance with the description accompanying FIG. 7 is used in connection with data records having more than one field with invalid data, such as the example data record 900 with multiple missing values 900$_1$ (corresponding to field D-R2v3 in FIG. 5B) and 900$_2$ (corresponding to field D-R6v7). It will be understood that the data record 900 is transformed (scaled) in the manner described above, and the similarity metric 901 (here the Euclidean distance) is calculated between the values in the transformed data record 900 and the final values of the weights of nodes of the trained tertiary model. However, the only values used in the calculation are the transformed values of the fields in the data record 900 containing valid data and the corresponding weights in each node of the trained tertiary model. Transformations for fields whose value is missing or invalid, and the weights in each node corresponding to those fields, are not used in the calculation.

As in FIG. 7, these similarity metric calculations are also illustrated using solid lines 901, from the valid input data fields to corresponding node weights in node no. 1(TR) ("TR" indicates that the values for the weights in a node are those resulting from the training discussed above in connection with FIG. 7), double dot-dash lines 902, from the valid fields to corresponding node weights in node no. 2(TR), and dotted lines 903, to 900P, indicating the same for the remainder of the nodes from node no. 3(TR) to node no. P(TR). As in FIG. 7, the similarity calculation is performed using transformations for the values of every valid field in a data record to the corresponding weights in every node, but not all lines are labeled in FIG. 9 for clarity of illustration. In a preferred embodiment a user can specify a maximum number of values that should be replaced in any given data record, for example, no more than 30% of the fields. When multiple invalid values are detected, and the number of invalid values does not exceed the maximum specified by the user, the computing system 100 accesses the list representation of replacement model data structure 800 that has been loaded in the transitory memory RAM 114 to identify the tertiary model to be used to generate replacement values, per the name of the tertiary model contained in the data structure 802 stored in list position 0, as described above. To summarize, the similarity metric calculation described here with reference to FIG. 9 corresponds to that described above with reference to FIG. 7, except that only the transformed values of valid fields are used in conjunction with the corresponding weights in each node. After a similarity metric for each node is calculated, the nodes are ranked in order of similarity, from the node that is the closest to the data record 900 (the smallest Euclidean distance) to the node that is the farthest from the data record 900 (the largest Euclidean distance).

FIG. 10 is a flowchart illustrating the method for generating replacement values using the tertiary model developed in FIG. 7 for an example using the data record 900 which is missing valid data for fields 3 and 7 (values v3 and v7). In FIG. 10 the weights of the nodes are identified as WCW-1, WCW-2, WCW-3, . . . , WCW-7, WCW-8, and WCW-9. Since the fields with the missing/invalid data are 3 and 7, the weights WCW-3 and WCW-8 are the weights that will be used to generate replacements for the missing values v3 and v7. That is, weight Wp-3 corresponds to value v3 and weight Wp-8 corresponds to value v7, per FIG. 7. Step S902 ranks the trained nodes 1(TR) to P(TR) in the order of their similarity to the data record of interest with the missing data. In the present example, this is determined by the process described in connection with FIG. 9 in which the similarity metric is the Euclidean distance between the transformed values of the valid data in the data record of interest 900 and the corresponding weights of the nodes. The steps S904$_{v3}$ and S904$_{v7}$ check the frequency at which the ranked nodes "won" in the training process described above in connection with FIG. 7. In general a suitable winning frequency is set at the discretion of the developer; an example of a minimum acceptable frequency would be 1/P, which represents nodes winning at an equal rate. Steps S906$_{v3}$ and S906$_{v7}$ calculate the sum of the respective weights W3 and W8 of the top J candidate winning nodes that also achieved the required winning frequency. In a preferred embodiment J is a small number such as three but any suitable small number can be used. In steps S908$_{v3}$ and S908$_{v7}$ the average of the top J candidate node weights is calculated for each weight W3 and W8 by summing the respective weight from each candidate node and dividing by each respective sum by J. To obtain a replacement value for each of the missing original values of the fields 3 and 7 the inverse of the original transformation used for the respective fields in data record 901 is applied to the averages at steps S910$_{v3}$ and S910$_{v7}$. After replacement values are generated for all missing values, the replacement values, in this example D-R2v3(I)REPL and D-R2v7(I) REPL can be inserted into the data record 900 as indicated by the arrows in FIG. 10 to form a new, complete, data record 900R.

The choice of the number J is at the discretion of the model developer. The criterion for choosing an appropriate value for J is that it be relatively small in relation to the number of nodes P. If the average of the weights is based on too many nodes, it would take into account an inordinate number of dissimilar nodes, thus adversely affecting the ability of the replacement value to represent the invalid data accurately. However, the value of J should be greater than 1 because the stochastic nature of the tertiary model training process could result in a node other than the top node being more representative of the data record containing invalid data. An odd number is preferred because it will account for ties in rankings of the top few nodes. Taking those factors into consideration, a typical application uses J=3.

If the data record originally came from the phase 2 faulty dataset 402 (FIG. 4A), the data record can be added to the phase 2 clean dataset 404, thereby providing augmented training data in the form of an additional data record for training or retraining the primary model. Alternatively, if the data record was a data record with new data to be processed by a primary model already placed in service, the data record is now ready for processing by the primary model.

Figure 11:
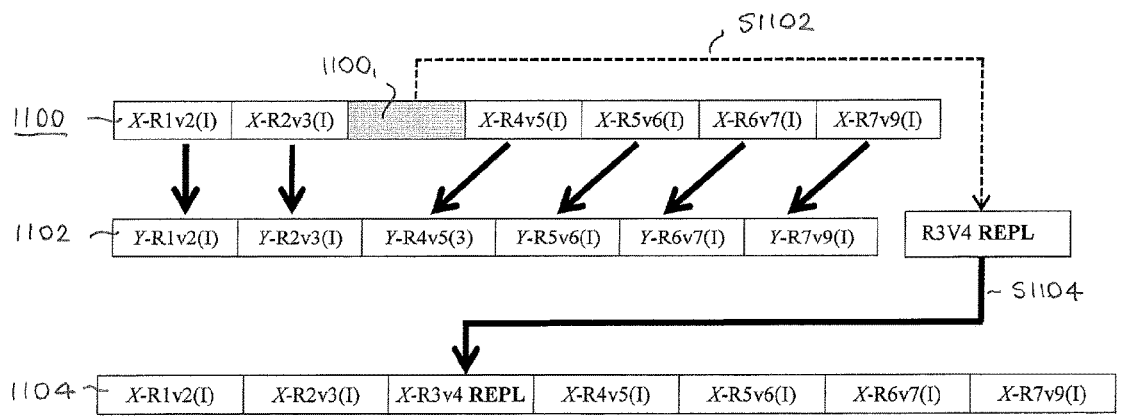
FIG. 11 illustrates a process for generating a single replacement data value in a particular record using a secondary model trained in accordance with FIG. 6.

FIG. 11 describes how a secondary model is employed when a data record 1100 with fields X-R1v2(I), X-R1v3(I), . . . , X-R1v6(I), X-R1v7(I), X-R1v9(1) has a single invalid value 1100$_1$. After identifying the original field number ("4" in this example) of the value that is missing, the values in data record 1100 are reorganized, preserving their relative sequential order, into a new data record 1102 with fields Y-R1v2(I), Y-R1v3(I), Y-R1v5(I), Y-R1v6(I), Y-R1v7(I), Y-R1v9(I). This data record is processed in step S1102 by the secondary model corresponding to field 4. This secondary model is identified as the model to use because the computing system references the entry 804 in corresponding position 4 in the replacement model data structure resident in the transitory memory 114, thus allowing retrieval of the appropriate secondary model by reference to element 804c of the entry. In summary, all of the valid values in the data record 1100 are placed in a data record 1102, which is input to the secondary model for the field 4, which then generates a replacement value. In step S1104 the replacement value R3v4(I) REPL is then substituted for the missing data in the data record 1102, to create the complete data record 1104. If the data record originally came from the phase 2 faulty dataset 402, the data record 1104 can be added to the phase 2 clean dataset 404 thereby providing augmented training data in the form of an additional data record for training or retraining the primary model. Alternatively, if the data record was a data record with new data to be processed by a primary model already placed in service, the data record is now ready for processing by the primary model.

SUMMARY

One aspect of the subject matter described herein relates to a system for autonomously and automatically preparing data for use by machine learning algorithms. An exemplary such system can comprise a computing system that comprises electronically connected non-transitory storage modules, transitory memory modules, and one or more central processing units configured and programmed to perform various ones of the following tasks in combination to achieve the results discussed above:

Extract data records from a dataset in non-transitory storage and transfer them to transitory memory;

Process each data record in transitory memory to determine the type of each field in the data record and to identify invalid values which may occur in any field;

Segregate data records which have no invalid values into a first dataset that is distinct from a second dataset that contains data records with invalid values;

Place the first dataset and the second dataset in non-transitory storage for subsequent use by the data preparation system;

Apply heuristics to all data records in the first dataset to identify fields which are deemed not useful for developing a primary machine learning algorithm;

Construct a first data structure in transitory memory that maintains information about the type of every field and the results of the application of heuristics to every field in the first dataset;

Place the first data structure into non-transitory storage at the conclusion of the application of heuristics for subsequent use by the data preparation system;

Construct, for every field designated as an input field in the data records in the first dataset and not eliminated by heuristics, a unique secondary single-field model for each field, based on a prediction or a classification machine learning algorithm, where the inputs for the single-field model are all other non-eliminated fields in the data record except the field that is being modeled and any target fields in the data record;

Construct, using all non-eliminated fields designated as input fields in the data records in the first dataset, one additional tertiary model based on a clustering machine learning algorithm;

Construct a second data structure in transitory memory that maintains information about fields, including the name of the field, the status of the field, the position of the field's values in a data record used by the primary model, and the name of a secondary model which can generate replacement values for the field;

Apply the single-field secondary models and the clustering tertiary model to data records in the second dataset to generate substitute values for fields which have invalid values, using a single-field model if a data record has only one invalid value, or using the clustering model if a data record has more than one invalid value, and augment the first dataset with data records containing replacement values; or similarly apply the single-field models and the clustering model to new data records intended to be used by the primary model when any new data records have invalid values; and Develop a primary model based on a machine learning algorithm using the data records in the first dataset and augmented data records as described above, ignoring fields eliminated by heuristics as identified in the first data structure, where the use of each field (input or target for the model) is specified by the model developer.

Another feature of systems, methods, and apparatus disclosed and claimed herein is the ability to create a data structure that contains information about fields used by the primary model and information about the secondary model and the tertiary clustering model. The data structure can be used in generating replacement values for fields with invalid values in data records intended for use by the primary model. In addition, tertiary clustering models can implement clustering algorithms that calculate similarity metrics in order for the algorithms to associate data records with nodes which identify groups of data records that are similar, in order to identify candidate nodes to effect generation of replacement values for fields when multiple fields in a subject data record contain invalid values. In another aspect, a single-field secondary model is a non-linear model which is either a prediction model or a classification model, depending on whether the field contains continuous numeric values or discrete class labels.

The clustering models referred to above can incorporate a programmatically accessible data structure which includes information about the nature of the transformations that were applied to fields in order that similarity calculations can be performed for data records used to train the clustering model. In addition, the model can incorporate a programmatically accessible data structure which includes information about the frequency that data records were assigned to each node of the model based on the values of similarity metrics computed during training of the clustering model.

In another aspect, a clustering model can be of a form in which the qualities of data records which resulted in the data records being assigned to a node identified by the model are summarized by values contained in a programmatically accessible data structure whose organization corresponds to, and can be mapped to, fields not eliminated from data records used to train the primary model. In yet another exemplary clustering model, replacement values for a data record intended for processing by the primary model and containing multiple missing values are generated by performing inverse transformations of the average of candidate node weights which correspond to the missing values in a data record intended for processing by the primary model. The average is calculated using weight values from a predetermined number of top nodes which were most similar to the data record based on a similarity metric, and whose weights were adjusted with sufficient frequency during training of the clustering model, wherein similarity is calculated using only the transformations of valid values in the data record and their corresponding weight values in each node.

While the examples and embodiments presented herein suggest that secondary and tertiary model development, and the calculation of winning frequencies and similarity metrics, are performed on computing systems using general purpose central processing units (CPUs), one skilled in the art would recognize that development of the primary, secondary, and tertiary models, as well as implementation of the decision logic for choosing a model for field value replacement and calculation of the similarity metrics and other values used by the tertiary model, could be performed using special purpose computing systems that use graphical processing units (GPUs) as computation engines, or other hybrid hardware-software systems specifically designed to efficiently implement machine learning algorithms and other parallel operations such as those used to calculate similarity metrics and other values in clustering models.

In addition, although the systems and methods are generally described in the context of an embodiment in which the computer used to implement the various steps of the methods and the associated computer memories are resident on a local computing system 100, a computing system for implementing systems and methods according to the various aspects of the invention can be wholly or partially cloud-based. For example, a vendor could make available a system in which a developer could upload to a cloud-based server a base dataset of historical data values for processing to produce secondary and tertiary models used to train a primary model resident on the developer's local computer. Likewise, the various datasets and data structures created during model development as described herein can be stored in cloud-based storage, local storage, or a combination of both. Alternatively, a vendor could make available to a developer a package of computer software necessary for implementing the disclosed systems and methods to prepare data for training a primary model using historical data and/or to prepare new data for processing by the primary model after the trained primary model is placed in service.

This summary is intended solely to introduce in a simplified form a selection of concepts that have been described in detail above. It is not intended necessarily to identify key or essential features of all of the inventive concepts and aspects of the systems, apparatus, and methods described in detail herein. Those skilled in the art will readily recognize that only selected preferred embodiments of the invention have been depicted and described, and it will be understood that various changes and modifications can be made other than those specifically mentioned above without departing from the spirit and scope of the invention, which is defined solely by the claims that follow.

What is claimed is:

1. A method of producing plural secondary model machine learning algorithms for replacing invalid data values in a stored base dataset that includes a plurality of historical data records each having a like plurality of corresponding fields, plural said fields being designated as inputs for training a primary model machine learning algorithm to generate an output of interest, the method comprising:

storing in a computer memory a field status data structure with a field status entry uniquely associated with each field in the data records in the base dataset, wherein each field status entry includes a field number element indicating the position of said field in the data records in the stored base dataset and an elimination code element indicating whether or not the data values associated with said field have utility for training the primary model machine learning algorithm to generate the output of interest;

creating an auxiliary clean dataset by eliminating from the base dataset any faulty historical data record having at least one field with an invalid data value, any field that has no utility for training the primary model, and any field representing the output of interest;

producing the plural individual computer-implemented secondary model machine learning algorithms by using data records in the auxiliary clean dataset as training data, each secondary model machine learning algorithm being associated with one of the fields of the auxiliary clean dataset, wherein each said secondary model machine learning algorithm is trained by (A) designating all but one said field of data records in said auxiliary clean dataset as training input data values and designating the remaining field data value as a training target value for the secondary model machine learning algorithm associated with said field, and (B) repeating step (A) for each field in said auxiliary clean dataset;

storing in a computer memory a replacement model data structure with replacement entries uniquely associated with respective fields in the base dataset, the position of each replacement entry in the replacement model data structure being indicative of the field number element in the corresponding field status data structure, and each entry including (a) a field index element indicating the position for the field value in a data record organized for use by a primary model machine learning algorithm, and (b) a secondary model element indicating either (i) the trained secondary model machine learning algorithm associated with said field, or (ii) that no secondary model machine learning algorithm is associated with said field as indicated by the elimination code element associated with said field in the corresponding field status data structure.

2. A method as in claim 1, wherein the method further comprises including in each field status entry a type code element indicating (i) whether or not the data values in the field associated with said entry will be used to produce a secondary model machine learning algorithm, and (ii) whether the data values of the training outputs of data records used to produce the secondary model machine learning algorithm for said field are in continuous numeric form or discrete categorical form.

3. A method as in claim 2, wherein the secondary model machine learning algorithms comprise multi-layer feed-forward neural networks trained by back-propagation.

4. A method for training a primary model machine learning algorithm using trained secondary model machine learning algorithms produced as in claim 1, the method comprising:

(a1) creating a faulty dataset comprising faulty historical data records eliminated from the base dataset;

(b1) identifying in the faulty dataset a faulty historical data record with a single field having an invalid data value;

(c1) accessing the replacement entry in the replacement model data structure corresponding to the single field identified in step (b1) to determine whether or not said single field in said faulty historical data record has a trained secondary model machine learning algorithm associated with said field;

(d1) using said trained secondary model machine learning algorithm associated with said field accessed in step (c1) to create a replacement data value;

(e1) substituting the replacement data value for the invalid data value identified in step (b1) to create an augmented training data record;

(f1) repeating steps (b1) through (e1) a plurality of times for different data records in the faulty dataset; and (g1) using the data records in the clean dataset combined with the augmented training data records to train the primary model machine learning algorithm.

5. A method for using the primary model machine learning algorithm trained in accordance with claim 4 to generate an output of interest from a new data record with input fields corresponding to the designated input fields in the base dataset, the method comprising:

(a2) identifying in the new data record a single field with an invalid data value;

(b2) accessing the entry in the replacement model data structure corresponding to the single field identified in step (a2) to determine whether or not said single field has a trained secondary model machine learning algorithm associated with said field;

(c2) using said trained secondary model machine learning algorithm associated with said field accessed in step (b2) to create a replacement data value for the invalid data value in said new data record;

(d2) substituting the replacement data value for the invalid data value identified in step (a2) to create an augmented new data record; and (e2) using the primary model machine learning algorithm to generate the output of interest from the augmented new data record.

6. A method as in claim 1, further comprising using a heuristic analysis to identify any of the fields in the historical data records designated as inputs for the primary model machine learning algorithm that contain data values having no utility for training the primary model machine learning algorithm to generate the output of interest.

7. A method as in claim 1, wherein the replacement model data structure includes a security signature appended thereto for permitting detection of inadvertent or malicious modification of the replacement model data structure.

8. A method as in claim 1, further comprising using the replacement model data structure to reorder field data values in a new data record to place them in the same order as the field data values in the historical data records so that data values in the new data record are presented to the primary model machine learning algorithm in the proper order.

9. A method as in claim 1, further comprising using the replacement model data structure to reorder field data values in a new data record to place them in the same order as the field data values in the historical data records so that data values in the new data record are presented to the primary model machine learning algorithm in the proper order.

10. A method of producing a tertiary model machine learning clustering algorithm for replacing invalid data values in a stored base dataset that includes a plurality of historical data records each having a like plurality of corresponding fields, plural said fields being designated as inputs for training a primary model machine learning algorithm to generate an output of interest, the method comprising:

creating an auxiliary clean dataset by eliminating from the base dataset any faulty historical data record having at least one field with an invalid data value, any field that has no utility for training the primary model machine learning algorithm, and any field representing the output of interest; and producing the computer-implemented tertiary model machine learning clustering algorithm by using data records in the auxiliary clean dataset as training data, wherein the trained tertiary model machine learning clustering algorithm comprises a plurality of nodes with respective weights that are representative of clusters of records in the auxiliary clean dataset deemed to be similar based on the calculation of a similarity metric during the training of the tertiary model machine learning clustering algorithm; and storing in a computer memory a replacement model data structure with a tertiary model entry identifying the trained tertiary model machine learning clustering algorithm for use in creating respective replacement data values for historical data records with multiple fields having invalid data values.

11. A method for training a primary model machine learning algorithm using the trained tertiary model machine learning clustering algorithm produced as in claim 10, the method comprising:

(a) creating a faulty dataset comprising faulty historical data records eliminated from the base dataset;

(b) identifying in the faulty dataset a faulty historical data record with multiple fields having invalid data values;

(c) accessing the trained tertiary model machine learning clustering algorithm identified by the tertiary model entry in the replacement model data structure;

(d) using said trained tertiary model machine learning clustering algorithm accessed in step (c) to create said respective replacement data values for the multiple fields having invalid data values in said faulty historical data record identified in step (b);

(e) substituting the respective replacement data values for the multiple invalid data values in said faulty historical data record to create an augmented training data record;

(f) repeating steps (b) through (e) a plurality of times for different data records in the faulty dataset; and (g) using the data records in the clean dataset combined with the augmented training data records to train the primary model machine learning algorithm.

12. A method for using the primary model machine learning algorithm trained in accordance with claim 11 to generate an output of interest from a new data record with input fields corresponding to the designated input fields in the base dataset, the method comprising:

(a1) identifying in the new data record multiple fields with invalid data values;

(b1) accessing the trained tertiary model machine learning clustering algorithm identified by the tertiary model entry in the replacement model data structure;

(c1) using the trained tertiary model machine learning clustering algorithm accessed in step (b1) to create replacement data values for the respective invalid data values in said new data record;

(d1) substituting the replacement data values for the respective invalid data values identified in step (a1) to create an augmented new data record; and (e1) using the primary model machine learning algorithm to generate the output of interest from the augmented new data record.

13. A method as in claim 12, further comprising setting a limit on the number of invalid data values to be replaced in a new data record.

14. A method as in claim 10, further comprising using a heuristic analysis to identify any of the fields in the historical data records designated as inputs for the primary model machine learning algorithm that contain data values having no utility for training the primary model machine learning algorithm to generate the output of interest.

15. A method as in claim 10, wherein the replacement model data structure includes a security signature appended thereto for permitting detection of inadvertent or malicious modification of the replacement data structure.

16. A method as in claim 10, further comprising using the replacement model data structure to reorder field data values in a new data record to place them in the same order as the field data values in the historical data records so that data values in the new data record are presented to the primary model machine learning algorithm in the proper order.

17. A method of creating an augmented training data record for training a primary model machine learning algorithm by using a plurality of historical data records each having a like plurality of corresponding fields, plural said fields being designated as inputs for training the primary model machine learning algorithm to generate an output of interest, the method comprising:

(a) creating an auxiliary clean dataset by eliminating from the base dataset any faulty historical data records having at least one field with an invalid data value, any field that has no utility for training the primary model, and any field representing the output of interest:

(b) producing a computer-implemented tertiary model machine learning clustering algorithm by using data records in the auxiliary clean dataset as training data, wherein the trained tertiary model machine learning clustering algorithm comprises a plurality of nodes with respective weights that are representative of clusters of records in the auxiliary clean dataset deemed to be similar based on the calculation of a similarity metric during the training of the tertiary model machine learning clustering algorithm;

(c) identifying a faulty historical data record eliminated from the base dataset and having multiple fields with invalid data values;

(d) using said trained tertiary model machine learning clustering algorithm to create respective replacement data values for the multiple fields having invalid data values in said faulty historical data record by (1) calculating the similarity metric between the weights of each node and each of the fields with valid data values in said faulty historical data record, (2) using the respective similarity metrics to designate a predetermined number of winning nodes as having weights mot similar to the corresponding valid values of respective fields in said faulty historical data record with invalid data values, (3) calculating respective averages of the weights of the winning nodes associated with each of the invalid data values, and (4) using said respective average weights to create respective replacement values for each of the invalid data values in the fields associated with the weights;

(e) substituting the respective replacement data values for the invalid data values in said faulty historical data record to create an augmented training data record; and (f) repeating steps (c) through (e) a plurality of times for different faulty historical data records eliminated from the base dataset and having multiple fields with invalid data values.

18. A method as in claim 17, further comprising using the frequency of assignment of nodes during training of the tertiary machine learning clustering algorithm as a factor in determining the number of nodes in the tertiary model machine learning clustering algorithm that should be used to create replacement data values.

19. A method as in claim 17, wherein said tertiary model machine learning clustering algorithm comprises a self-organizing map and the similarity metric is a distance feature used to determine the nodes having weights most similar to the corresponding valid values of respective fields in said faulty historical data record with invalid data values.

20. A method of producing plural secondary model machine learning algorithms and a tertiary model machine learning algorithm for replacing invalid data values in a stored base dataset that includes a plurality of historical data records each having a like plurality of corresponding fields designated as inputs for training a primary model machine learning algorithm to generate an output of interest, the method comprising:

storing in a computer memory a field status data structure with an entry uniquely associated with each field in the data records in the base dataset, wherein each field status entry includes a field number element indicating the position of said field in the data records in the stored base dataset and an elimination code element indicating whether or not the data values contained in said field have utility for training the primary model machine learning algorithm to generate the output of interest;

creating an auxiliary clean dataset by eliminating from the base dataset any faulty historical data record having a least one field with an invalid data value, any field that has no utility for training the primary model machine learning algorithm, and any field representing the output of interest;

producing the plural computer-implemented secondary model machine learning algorithms trained by using data records in the auxiliary clean dataset as training data, each secondary model machine learning algorithm being associated with one of the fields of the auxiliary clean dataset, wherein each said secondary model machine learning algorithm is trained by (a) designating all but one said field of data records in said auxiliary clean dataset as training input data values and designating the remaining field data value as a training target value for the secondary model machine learning algorithm associated with said field, and (b) repeating step (a) for each field in said auxiliary clean dataset;

producing the computer-implemented tertiary model machine learning clustering algorithm trained by using data records in the auxiliary clean dataset as training data, wherein the trained tertiary model machine learning clustering algorithm comprises a plurality of nodes with respective weights that are representative of clusters of records in the auxiliary clean dataset deemed to be similar based on the calculation of a similarity metric during the training of the tertiary model machine learning clustering algorithm; and storing in a computer memory a replacement model data structure with a tertiary model entry identifying the trained tertiary model machine learning clustering algorithm for use in creating respective replacement values for historical data records with multiple fields having invalid data values, and plural secondary model entries, each secondary model entry being uniquely associated with a respective field in the base dataset, wherein the position of each entry in the replacement model data structure is indicative of the field number element in the corresponding field status data structure, and each entry includes (a) a field index element indicating the position for the field value in a data record organized for use by a primary model machine learning algorithm, and (b) a secondary model element indicating either (i) the trained secondary model machine learning algorithm associated with said field, or (ii) that no secondary model machine learning algorithm is associated with said field as indicated by the elimination code element associated with said field in the corresponding field status data structure.

21. A method as in claim 20, wherein the method further comprises including in each field status entry a type code element indicating (i) whether or not the data values in the field associated with said entry will be used to produce a secondary model machine learning algorithm, and (ii) whether the data values of the training outputs of data records used to produce the secondary model machine learning algorithm for said field are in continuous numeric form or discrete categorical form.

22. A method as in claim 21, wherein the secondary model machine learning algorithms comprise multi-layer feed-forward neural networks trained by back-propagation.

23. A method for training a primary model machine learning algorithm using trained secondary model machine learning algorithms and the trained tertiary model machine learning clustering algorithm produced as in claim 20, the method comprising:
- (a1) creating a faulty dataset comprising faulty historical data records eliminated from the base dataset;
- (b1) identifying in the faulty dataset a faulty historical data record with a single field having an invalid data value;
- (c1) accessing the entry in the replacement model data structure corresponding to the single field identified in step (b1) to determine whether or not said single field in said faulty historical data record has a trained secondary model machine learning algorithm associated with said field;
- (d1) using said trained secondary model machine learning algorithm associated with said field accessed in step (c1) to create a replacement data value for said single field having an invalid data value identified in step (b1);
- (e1) substituting the replacement data value for the invalid data value in said field identified in step (b1) to create an augmented training data record including said replacement data value in place of said invalid data value;
- (f1) repeating steps (b1) through (e1) a plurality of times for different data records in the faulty dataset;
- (g1) identifying in the faulty dataset a faulty historical data record with multiple fields having invalid data values;
- (h1) accessing the trained tertiary model machine learning clustering algorithm identified by the tertiary model entry in the replacement model data structure;
- (i1) using said trained tertiary model machine learning clustering algorithm accessed in step (h1) to create said respective replacement data values for the multiple fields having invalid data values identified in step (g1);
- (j1) substituting the respective replacement data values for the multiple invalid data values in said faulty data record to create an augmented training data record including said replacement data values in place of respective said invalid data values; and
- (k1) using the data records in the clean dataset combined with the augmented training data records created in steps (e1) and (j1) to train the primary model machine learning algorithm.

24. A method as in claim 20, further comprising using a heuristic analysis to identify any of the fields in the historical data records designated as inputs for the primary model machine learning algorithm that contain data values having no utility for training the primary model machine learning algorithm to generate the output of interest.

25. A method as in claim 20, wherein the replacement model data structure includes a security signature appended thereto for permitting detection of inadvertent or malicious modification of the replacement data structure.

26. A method of creating an augmented training data record for training a primary model machine learning algorithm by using a plurality of historical data records each having a like plurality of corresponding fields, plural said fields being designated as inputs for training the primary model machine learning algorithm to generate an output of interest, the method comprising:
- (a) creating an auxiliary clean dataset by eliminating from the base dataset faulty historical data records having invalid data values, any field that has no utility for training the primary model machine learning algorithm, and any field representing the output of interest;
- (b) producing plural computer-implemented secondary model machine learning algorithms trained by using data records in the auxiliary clean dataset as training data, each secondary model machine learning algorithm being associated with one of the fields of the auxiliary clean dataset, wherein each said secondary model machine learning algorithm is trained by (A) designating all but one said field of data records in said auxiliary clean dataset as training input data values and designating the remaining field data value as a training target value for the secondary model machine learning algorithm associated with said field, and (B) repeating step (A) for each field in said auxiliary clean dataset;
- (c) producing a trained computer-implemented tertiary model machine learning clustering algorithm trained by using data records in the auxiliary clean dataset as training data, wherein the trained tertiary model machine learning clustering algorithm comprises a plurality of nodes with respective weights that are representative of clusters of records in the auxiliary clean dataset deemed to be similar based on the calculation of a similarity metric during the training of the tertiary model machine learning clustering algorithm;
- (d) creating a faulty dataset comprising faulty historical data records eliminated from the base dataset;
- (e) identifying in the faulty dataset a faulty historical data record with a single field having an invalid data value;
- (f) using said trained secondary model machine learning algorithm associated with said field identified in step (e) to create a replacement data value for said single field having an invalid data value;
- (g) substituting the replacement data value for the invalid data value in said single field identified in step (e) to create an augmented training data record for said single field;
- (h) repeating steps (e1 through (g) a plurality of times for different data records in the faulty dataset with a single field having an invalid data value;
- (j) identifying in the faulty dataset a faulty historical data record with multiple fields having invalid data values;
- (j) using said stored trained tertiary model machine learning clustering algorithm to create respective replacement data values for the multiple fields having invalid data values identified in step (j) by (1) calculating the similarity metric between the weights of each node and each of the fields with valid data values in said faulty data record, using the respective similarity metrics to designate a predetermined number of winning nodes having weights most similar to the corresponding valid values of respective fields in the faulty data record with invalid data values, calculating respective averages of the weights of the winning nodes associated with each of the invalid data values, and (4) using the respective average weights to create respective replacement values for each of the invalid data values in the fields associated with the weights;
- (k) substituting the respective replacement data values for the multiple invalid data values in said faulty data record to create an augmented training data record including said replacement values in place of said respective invalid data values; and (l) repeating steps (i) through (k) a plurality of times for different data records in the faulty dataset with multiple fields having invalid data values.

27. A method as in claim 26, wherein said tertiary model machine learning clustering algorithm comprises a self-organizing map and the similarity metric is a distance feature used to determine the nodes having weights most similar to the corresponding valid values of respective fields in said faulty historical data record with invalid data values.

* * * * *